(12) United States Patent
Chapman et al.

(10) Patent No.: US 7,693,826 B1
(45) Date of Patent: Apr. 6, 2010

(54) SYSTEM AND METHOD FOR PRE-COMPILING A QUERY AND PRE-KEYING A DATABASE SYSTEM

(75) Inventors: Richard K. Chapman, Boca Raton, FL (US); David A. Bayliss, Delray Beach, FL (US); Gavin C. Halliday, Royston (GB); Nigel G. Hicks, London (GB); Ole D. Poulsen, Bend, OR (US); Jacob Cobbett-Smith, Greater London (GB)

(73) Assignee: Seisint, Inc., Boca Raton, FL (US)

( * ) Notice: Subject to any disclaimer, the term of this patent is extended or adjusted under 35 U.S.C. 154(b) by 179 days.

(21) Appl. No.: 10/866,270

(22) Filed: Jun. 11, 2004

(51) Int. Cl.
*G06F 7/00* (2006.01)
*G06F 17/30* (2006.01)

(52) U.S. Cl. .................. 707/3; 707/10; 707/7

(58) Field of Classification Search ............. None
See application file for complete search history.

(56) References Cited

U.S. PATENT DOCUMENTS

| | | | |
|---|---|---|---|
| 4,543,630 A | 9/1985 | Neches | |
| 5,301,333 A | 4/1994 | Lee | |
| 5,349,682 A * | 9/1994 | Rosenberry | 718/102 |
| 5,418,937 A | 5/1995 | Inoue | |
| 5,437,032 A | 7/1995 | Wolf et al. | |
| 5,504,886 A * | 4/1996 | Chang et al. | 707/2 |
| 5,515,531 A | 5/1996 | Fujiwara et al. | |
| 5,551,027 A | 8/1996 | Choy et al. | |
| 5,675,742 A | 10/1997 | Jain et al. | |
| 5,717,911 A * | 2/1998 | Madrid et al. | 707/2 |
| 5,752,031 A | 5/1998 | Cutler et al. | |
| 5,857,180 A | 1/1999 | Hallmark et al. | |
| 6,038,563 A | 3/2000 | Bapat et al. | |
| 6,092,062 A * | 7/2000 | Lohman et al. | 707/2 |
| 6,144,992 A | 11/2000 | Turpin et al. | |
| 6,351,742 B1 | 2/2002 | Agarwal et al. | |
| 6,438,537 B1 | 8/2002 | Netz et al. | |
| 6,438,562 B1 | 8/2002 | Gupta et al. | |
| 6,449,356 B1 | 9/2002 | Dezonno | |
| 6,505,205 B1 | 1/2003 | Kothuri et al. | |

(Continued)

OTHER PUBLICATIONS

Avi Kavas; Using multicast to pre-load jobs on the ParPar cluster; Feb. 2001; Parallel Computing, vol. 27, Issue 3 pp. 315-327.*

(Continued)

*Primary Examiner*—Tony Mahmoudi
*Assistant Examiner*—Mariela D Reyes
(74) *Attorney, Agent, or Firm*—Finnegan, Henderson, Farabow, Garrett & Dunner, L.L.P.

(57) ABSTRACT

A parallel database system capable of deploying a pre-compiled query and pre-keying data associated with the pre-compiled query includes at least one master node. The at least one master node is operable to store and execute a pre-compiled query that is capable of resolving a data request received by the parallel database system. The system further includes a plurality of slave nodes coupled to the at least one master node. In this particular embodiment, each of the plurality of slave nodes is operable to store one or more key parts. The one or more key parts include data capable of resolving a portion of the pre-compiled query.

24 Claims, 6 Drawing Sheets

U.S. PATENT DOCUMENTS

| | | | |
|---|---|---|---|
| 6,546,403 | B1 | 4/2003 | Carlson, Jr. et al. |
| 6,694,337 | B1 | 2/2004 | King et al. |
| 6,886,046 | B2 | 4/2005 | Stutz et al. |
| 6,993,774 | B1 | 1/2006 | Glass |
| 7,007,070 | B1 | 2/2006 | Hickman |
| 7,054,910 | B1 | 5/2006 | Nordin et al. |
| 7,158,975 | B2 | 1/2007 | Mazzagatti |
| 2001/0053957 | A1* | 12/2001 | Blair et al. ............ 702/19 |
| 2002/0065884 | A1 | 5/2002 | Donoho et al. |
| 2002/0138582 | A1 | 9/2002 | Chandra et al. |
| 2002/0143755 | A1 | 10/2002 | Wynblatt et al. |
| 2002/0152188 | A1 | 10/2002 | Crus et al. |
| 2002/0184314 | A1 | 12/2002 | Riise |
| 2003/0018645 | A1* | 1/2003 | Kong ............... 707/100 |
| 2003/0069923 | A1 | 4/2003 | Peart |
| 2003/0078858 | A1 | 4/2003 | Angelopoulos et al. |
| 2003/0200282 | A1 | 10/2003 | Arnold et al. |
| 2003/0220941 | A1 | 11/2003 | Arnold et al. |
| 2004/0088294 | A1 | 5/2004 | Lerhaupt |
| 2004/0098370 | A1 | 5/2004 | Garland et al. |
| 2004/0098390 | A1* | 5/2004 | Bayliss et al. ............ 707/7 |
| 2004/0143644 | A1 | 7/2004 | Berton et al. |
| 2004/0162822 | A1 | 8/2004 | Papanyan et al. |
| 2004/0204988 | A1 | 10/2004 | Willers et al. |
| 2004/0260685 | A1* | 12/2004 | Pfleiger et al. ............ 707/3 |
| 2004/0267719 | A1 | 12/2004 | Doherty et al. |
| 2005/0187977 | A1* | 8/2005 | Frost ............... 707/104.1 |

OTHER PUBLICATIONS

System and Method for Processing Query Requests in a Database System, by Richard K. Chapman, et al., U.S. Appl. No. 10/866,204, Pending, 122 pages, Jun. 11, 2004.

System and Method for Processing a Request to Perform an Activity Associated with a Precompiled Query, by Richard K. Chapman, et al., U.S. Appl. No. 10/866,565, Pending, 123 pages, Jun. 11, 2004.

System and Method for Returning Results of a Query from One or More Slave Nodes to One or More Master Nodes of a Database System, by Richard K. Chapman, et al., U.S. Appl. No. 10/866,456, Pending, 120 pages, Jun. 11, 2004.

System and Method for Enhancing System Reliability using Multiple Channels and Multicast, by Richard K. Chapman, et al., U.S. Appl. No. 10/866,604, Pending, 79 pages, Jun. 11, 2004.

System and Method for using Activity Identifications in a Database System, by Richard K. Chapman, et al., U.S. Appl. No. 10/865,954, Pending, 79 pages, Jun. 11, 2004.

System and Method for Dynamically Creating Keys in a Database System, by Richard K. Chapman, et al., U.S. Appl. No. 10/866,616, Pending, 67 pages, Jun. 11, 2004.

System and Method for Distributing Data in a Parallel Processing System, by Richard K. Chapman, et al., U.S. Appl. No. 10/866,620, Pending, 79 pages, Jun. 11, 2004.

System and Method for Managing Throughout in the Processing of Query Requests in a Database System, by Richard K. Chapman, et al., U.S. Appl. No. 10/866,394, Pending, 122 pages, Jun. 11, 2004.

Oracle71M Server Distributed Systems, vol. II: Replicated Data, Release 7.3, Feb. 1996, Oracle@.

Liu, Ling, "Query Routing in Large-scale Digital Library Systems", Data Engineering, 1999 Proceedings, 15$^{th}$ International conference on Sydney, NSW, Australia, Mar. 23-26, 1999, Los Alamitos, CA, USA, IEEE Computer Society, Mar. 23, 1999, pp. 154-163.

Bonnet et al., "Query Processing in a Device Database System", Cornell University, Technical Report: TR99-1775, Oct. 1999, 26 pages.

* cited by examiner

| | FIRST | LAST | ADDRESS | FILE NUMBER |
|---|---|---|---|---|
| | AARON | AASKEY | 456 | 1 |
| 434A | AARON | BAKER | 1745 | 2 |
| | ⋮ | ⋮ | ⋮ | ⋮ |
| | CHAD | THOMAS | 321 | 16,729 |
| | FIRST | LAST | ADDRESS | FILE NUMBER |
| | CHAD | TOMAS | 149 | 16,730 |
| 434B | CHAD | TUPPER | 6371 | 16,731 |
| | ⋮ | ⋮ | ⋮ | ⋮ |
| | CONNOR | McCONNELL | 1142 | 80,542 |
| | FIRST | LAST | ADDRESS | FILE NUMBER |
| | YEN | LEE | 9234 | 1,000,052 |
| | YEN | WEI | 514 | 1,000,053 |
| 434N | ⋮ | ⋮ | ⋮ | ⋮ |
| | ZACK | ZYMOL | 2947 | 1,495,751 |

| | 502 | 504 | 506 | 508 |
|---|---|---|---|---|
| | FIRST | LAST | ADDRESS | NODE |
| | CHAD | THOMAS | 321 | $114_1$ |
| 536 → | CONNOR | McCONNELL | 1142 | $114_2$ |
| | ⋮ | ⋮ | ⋮ | ⋮ |
| | ZACK | ZYMOL | 2947 | $114_N$ |

US 7,693,826 B1

SYSTEM AND METHOD FOR PRE-COMPILING A QUERY AND PRE-KEYING A DATABASE SYSTEM

TECHNICAL FIELD OF THE INVENTION

This invention relates in general to computing systems, and more particularly to a system and method for deploying a pre-compiled query and pre-keying a database system.

OVERVIEW

Conventional relational database systems are often capable of storing, organizing, and/or processing large amounts of data. As an example, relational database systems may be capable of storing, organizing, and/or processing many millions or billions of records. In these systems, data organization is vital to the processing efficiency of the database system. Data organization within the relational database system is particularly important in relational database systems that execute relatively complex queries and other commands involving relatively large amounts of data.

In a typical relational database system, relationships are used to break down the data into simpler structures for storage in one or more data-storage devices. As a result, related information may be stored and distributed over multiple data-storage devices. In most cases, before a relational database system can process a query, the relational database system must redistribute the data so that it may be processed and/or correlated according to the received query.

SUMMARY OF EXAMPLE EMBODIMENTS

According to a system embodiment, a parallel database system capable of deploying a pre-compiled query and pre-keying data associated with the pre-compiled query comprises at least one master node. The at least one master node is operable to store and execute a pre-compiled query that is capable of resolving a data request received by the parallel database system. The system further comprises a plurality of slave nodes that are coupled to the at least one master node. In this embodiment, each of the plurality of slave nodes is operable to store one or more key parts. The one or more key parts include data that is capable of resolving a portion of the pre-compiled query.

According to another system embodiment, a computer-implemented system for pre-keying a database system comprises one or more computer processors that are collectively operable to deploy a pre-compiled query to at least one master node. The pre-compiled query operates to resolve a data request that is received by the database system. The computer processors further collectively operable to deploy a plurality of key parts to a plurality of slave nodes. Each of the plurality of key parts includes data that is capable of resolving a portion of the pre-compiled query. The computer processors also collectively operable to deploy one or more top level keys to the at least one master node. The one or more top level keys capable of identifying a location of the plurality of key parts within the database system.

According to one exemplary method of forming the present invention, a method of forming a database system comprises deploying a pre-compiled query to at least one master node. The pre-compiled query is operable to resolve a data request that is received by the database system. The method further comprises pre-keying the database system. In one particular embodiment, pre-keying the database system comprises deploying a plurality of key parts to a plurality of slave nodes. In that example, each of the plurality of key parts comprises data capable of resolving a portion of the pre-compiled query. The method of pre-keying the database system further comprises deploying one or more top level keys to the at least one master node. The one or more top level keys are capable of identifying a location of the plurality of key parts within the database system.

Depending on the specific features implemented, particular embodiments of the present invention may exhibit some, none, or all of the following technical advantages. Various embodiments may be capable of improving the processing efficiency of a database system. Some embodiments may be capable of pre-keying the database system. Other embodiments may be capable of deploying a pre-compiled query to the database system.

Other technical advantages will be readily apparent to one skilled in the art from the following figures, description and claims. Moreover, while specific advantages have been enumerated, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF EXAMPLE EMBODIMENTS

Figure 1:
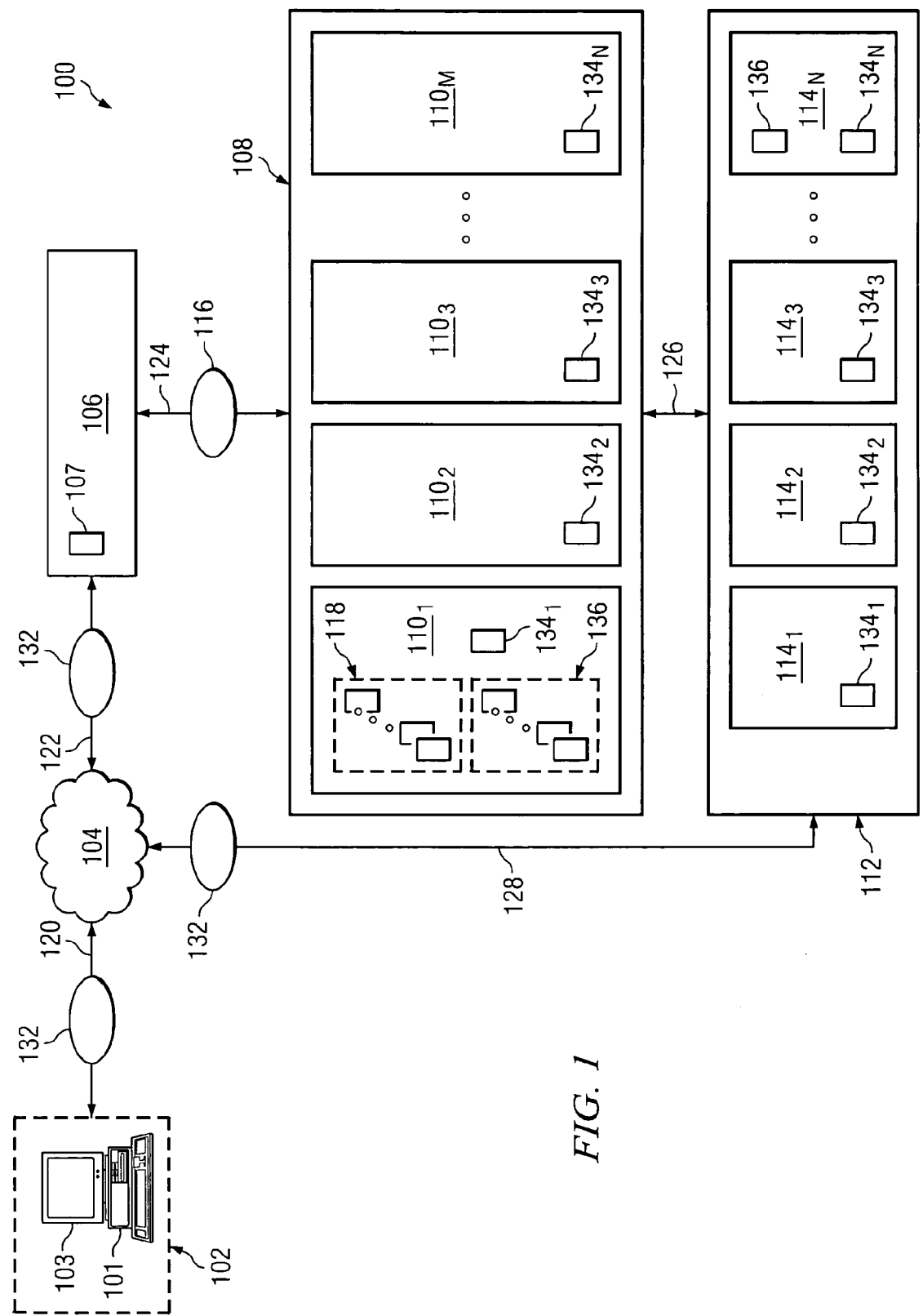
FIG. 1 is a block diagram of one embodiment of a database system capable of deploying a pre-compiled query and enhancing the reliability of the system.

FIG. 1 is a block diagram of one embodiment of a database system 100 capable of deploying a pre-compiled query and enhancing the reliability of system 100. FIG. 1 illustrates just one example embodiment of system 100. It should be appreciated that other embodiments of system 100 may be used without departing from the scope of the present disclosure. As used throughout this document, the term "pre-compiled query" refers to a query that has been deployed on a database system in advance of a user executing such query on such database system.

In this example, system 100 includes a first database system 108 capable of performing one or more desired computing and/or communicating functions. For example, first database system 108 may be capable of storing, organizing, sorting, processing, correlating, and/or communicating one or more keys and/or indices associated with one or more data files. In addition, first database system 108 may be capable of, for example, storing, processing, and/or executing one or more pre-compiled queries. First database system 108 may comprise any device or combination of devices that may include one or more hardware, software, and/or firmware modules.

In this example, first database system 108 comprises a parallel-processing database that includes a plurality of first nodes $110_1$-$110_M$ capable of storing, organizing, correlating, processing, distributing, and/or manipulating data. In various embodiments, each of first nodes 110 can comprise or have access to, for example, one or more processor modules, one or more memory modules, and/or one or more software modules. In some embodiments, each of nodes 110 can comprise, for example, a master node, a slave node, or a combination of a master and slave node. In this particular embodiment, each of nodes 110 operates as both a master node and a slave node.

System 100 also includes a second database system 112 capable of performing one or more desired computing and/or communicating functions. For example, second database system 112 may be capable of storing, organizing, sorting, distributing, processing, correlating, and/or communicating data associated with one or more data files. Second database system 112 may comprise any device or combination of devices that may include one or more hardware, software, and/or firmware modules. In this example, second database system 112 comprises a parallel-processing database that includes a plurality of second nodes $114_1$-$114_N$ capable of storing, organizing, correlating, processing, distributing, and/or manipulating data. In various embodiments, each of second nodes 114 can comprise or have access to, for example, one or more processor modules, one or more memory modules, and/or one or more software modules.

In this particular embodiment, second database system 112 stores data associated with one or more data files in tables that are distributed over second nodes $114_1$-$114_N$. As used throughout this document, the term "table" refers to any data structure, arrangement, or compilation of information. In certain embodiments, each table can include a plurality of rows that are distributed over a plurality of second nodes $114_1$-$114_N$. In some embodiments, each table may include a plurality of rows that can be evenly distributed over at least some of second nodes $114_1$-$114_N$.

In some embodiments, second database system 112 may include one or more processors capable of managing the organization of the stored data and coordinating the retrieval of the data from second nodes $114_1$-$114_N$ in response to queries, commands, and/or requests received by second database system 112. In various embodiments, second database system 112 can receive requests, commands, and/or queries in a standard format, such as, for example, structured query language (SQL), extensible markup language (XML), hypertext markup language (HTML), or any other desired format.

In this example, a client 102 couples to system 100 through a network 104. Client 102 may include any computing and/or communication device operable to communicate and/or receive information. For example, each client 102 may include a web server, a work station, a mainframe computer, a mini-frame computer, a desktop computer, a laptop computer, a personal digital assistant, a wireless device, and/or any other computing or communicating device or combination of devices. In operation, client 102 may execute with any of the well-known MS-DOS, PC-DOS, OS-2, MAC-OS, WINDOWS™, LINUX, UNIX, or other appropriate operating systems.

In this particular embodiment, client 102 includes a query building module 101 and a graphical user interface (GUI) 103 that enable a user to display, create, retrieve, and/or amend queries for use by system 100. In some cases, query building module 101 and/or GUI 103 can allow a user to identify one or more combinations of variables to be used in processing the query and/or to be used in organizing data for processing the query. In various embodiments, query building module 101 and GUI 103 enable a user to create and/or amend a query that is capable of resolving future and/or routine data requests on system 108. For example, a user of client 102 can create and/or amend a query that returns one or more desired address or range of addresses when any combination of one or more first names, one or more last names, or one or more social security numbers are supplied in a request to system 108. That is, when any of the plurality of variables is supplied in a request to system 108, the query enables system 108 to provide the appropriate address or addresses as an output.

In other embodiments, query building module 101 and GUI 103 enable a user to create and/or amend a query that is capable of returning any one of a plurality of desired responses or ranges of responses. In other words, when any of the plurality of variables is supplied in a request to database system 108, the query enables system 108 to provide any one of a plurality of desired outputs or ranges of desired outputs. In one non-limiting example, a user of client 102 can create and/or amend a query that that enables a user of system 108 to input any combination of variables, and return one or more desired responses or ranges of responses. For example, a user of client 102 can create and/or amend a query that returns all vehicle owners having a specific first name, such as Richard, when any combination of one or more years a vehicle was produced, one or more vehicle makes, one or more vehicle models, one or more vehicle colors, one or more states of vehicle registration, one or more vehicle suggested retail prices, and one or more zip codes that a vehicle was sold in of vehicle is supplied in a request to system 108.

In various embodiments, query building module 101 and/or GUI 103 may enable a user of client 102 to create and/or amend a desired query using one or more query programming languages. The programming language can comprise, for example, C++, Enterprise Control Language (ECL), Structured Query Language (SQL), Perl, or a combination of these or other programming languages. In some cases, a user of client 102 can input one or more programming instructions associated with the query programming language to create and/or amend a desired query using query building module 101 and/or GUI 103.

Query building module 101 can comprise any device or combination of devices that may include one or more hardware, software, and/or firmware modules. In various embodiments, query building module 101 may comprise, for example, software capable of being executed on client 102. In other embodiments, query building module 101 may comprise the necessary hardware, software, and/or firmware capable of providing an extensible markup language (XML) or hypertext markup language (HTML) template for display on GUI 103.

In this example, client 102 generates a representation 132 of the query created and/or amended by the user of client 102. In some embodiments, query representation 132 can include and/or identify one or more combinations of variables to be used in processing the query and/or organizing data for processing the query. In this particular embodiment, query representation 132 comprises an HTML document that represents a query that is capable of resolving future and/or routine data requests on system 108. In other embodiments, query representation 132 could comprise, for example, an XML document, a text file, or any other representation of the desired query.

In this example, client 102 communicates query representation 132 to a query module 106 and to second database system 112 through a network 104. Network 104 couples to client 102 through communications link 120, to query module 106 through communications link 122, and to second database system 112 through communications link 128. As used throughout this document, the term "couple" and/or "coupled" refers to any direct or indirect communication between two or more elements, whether or not those elements are in physical contact with one another.

Network 104 may comprise any wireless network, wireline network, or combination of wireless and wireline networks capable of supporting communication between network elements using ground-based and/or space-based components. For example, network 104 may comprise a data network, a public switched telephone network (PSTN), an integrated services digital network (ISDN), a local area network (LAN), a wide area network (WAN), a metropolitan area network (MAN), all or a portion of the global computer network known as the Internet, and/or other communication systems or combination of communication systems at one or more locations.

In various embodiments, second database system 112 processes query representation 132 and performs the necessary computing functions to resolve one or more actions associated with query representation 132. In this particular embodiment, second database system 112 processes query representation 132 and performs one or more sorts on portions of the data stored on nodes $114_1$-$114_N$ based at least in part on one or more combinations of variables identified by the user of client 102 for processing the query and/or organizing data for processing the query. The sorts of the data result in the formation of one or more distributed tables of the data necessary to resolve at least a portion of query representation 132. For example, where query representation 132 is created to return a desired response when any of a plurality of variables is provided to first database system 108, second database system 112 operates to sort the appropriate data according to various combinations of the variables.

As one particular non-limiting example, query representation 132 is capable of returning one or more desired addresses or ranges of addresses when any combination of one or more first names, one or more last names, or one or more social security numbers are provided to first database system 108. In that case, second database system 112 processes query representation 132 and sorts the data according to various combinations of the input variables. For example, second database system 112 may sort the data by first name, last name, and address; by last name and address; by social security number and address; or by any other appropriate combination. In some cases, the user of client 102 can identify one or more combinations of input variables to be used in processing the query associated with query representation 132.

In most cases, the one or more sorts of the data within second database system 112 create one or more tables that are distributed over one or more of second nodes $114_1$-$114_N$. In some cases, the sort of the data within second database system 112 creates a table that is distributed over each of nodes $114_1$-$114_N$. In various embodiments, each of second nodes $114_1$-$114_N$ that receives a portion of the distributed table stores that portion as a key part 134. As used throughout this document, the term "key part" refers to a portion of a sorted data file that includes data capable of identifying the location of additional data and/or satisfying at least a portion of query representation 132.

Moreover, the sort of the data within second database system 112 also generates a top level key 136 for each table. Top level key 136 operates to identify the location within database system 112 of each key part 134 associated with the respective table and/or key. For example, where second database system 112 generates a distributed table and/or key that is sorted by first name, top level key 136 identifies the location of each key part $134_1$-$134_N$ of the distributed table and/or key. Thus, if a first key part $134_1$ was stored on node $114_1$ and included first names ranging from Aaron to Brian, and a twentieth key part $134_{20}$ was stored on node $114_{20}$ and included first names ranging from Frank to Gavin, then top level key 136 would identify that first names ranging from Aaron to Brian are on node $114_1$ and first names ranging from Frank to Gavin are on node $114_{20}$. Top level key 136 may include any other suitable information, according to particular needs.

In some cases, top level key 136 and key parts $134_1$-$134_N$ can include additional information to assist in identifying the appropriate location of additional data. For example, if top level key 136 is created to identify the location of key parts 134 associated with a distributed table sorted by first name, then the top level key may include the first name, last name, and address of the last record associated with the respective key part 134.

In this example, query module 106 operates to convert, process, compile, and/or configure query representation 132 for use by system 108. Query module 106 can comprise any device or combination of devices that may include one or more hardware, software, and/or firmware modules. In various embodiments, query module 106 can operate to process query representation using, for example, Simple Object Access Protocol (SOAP).

In some embodiments, query module 106 can operate to convert query representation 132 into intermediary source code, such as, for example, source code segment structured in C, C++, Fortran, Pascal, and/or any other appropriate programming language. In other embodiments, query module 106 can operate to convert query representation 132 into a query execution graph representing a series of actions associated with the desired query. In some cases, query module 106 has access to and/or includes a programming language compiler, such as an ECL compiler, that converts query representation 132 into intermediary source code and/or a query execution graph. In those cases, the programming language compiler may be capable of mapping each action associated with the query execution graph to portions of the intermediary source code and/or one or more data files or tables associated with the respective action. In some cases, the programming language compiler can map one or more actions to a sorted table distributed on second database system 112.

In this particular embodiment, query module 106 converts query representation 132 into intermediary source code and a query execution graph, and compiles the intermediary source code to generate one or more executables in machine-level code. In some cases, query module 106 has access to and/or includes a programming language compiler, such as a C++ compiler, that converts the intermediate source code into the one or more executables. In various embodiments, the one or more executables can comprise, for example, dynamically-linked executables, fully-linked executables, or a shared library. In this example, the one or more executables comprise dynamic link libraries (DLL) that are capable of being executed dynamically, in whole or in part, by other executables.

In this particular embodiment, query module 106 includes a configuration tool 107 that annotates each action associated with the query execution graph and maps each action to one or more DLL's and/or data files or tables associated with the respective action. In various embodiments, configuration tool 107 can create one or more helper files capable of assisting in the processing of the annotated execution graph. In some cases, the one or more helper files can, for example, identify the appropriate DLL's and/or data files or tables for processing a particular action associated with the annotated query execution graph. In other embodiments, configuration tool 107 can identify one or more combinations of variables to be used in processing the annotated query execution graph and/or organizing data for processing annotated query execution graph. In those cases, configuration tool 107 can communicate such combinations of variables to second database system 112 for processing through network 104. Configuration tool 107 can comprise any device or combination of devices that may include one or more hardware, software, and/or firmware modules.

In some embodiments, configuration tool 107 can assign a unique identification to each action when forming the annotated query execution graph. In this particular example, configuration tool 107 assigns a base identification (base ID) to the query execution graph and unique activity identifications (activity ID's) to each remote action associated with the query execution graph. The remote action can, in some cases, involve at least one other node in resolving at least a portion of the query. In other embodiments, configuration tool 107 can assign activity ID's to each remote and local action associated with the query execution graph. In certain embodiments, the activity ID assigned to each remote action may include, for example, the base ID associated with the query execution graph and a unique identifier capable of identifying the remote action with respect to other remote actions for the particular annotated query execution graph. In other embodiments, the activity ID can distinguish the particular action associated with a particular query execution graph from other actions associated with other query execution graphs. Thus, the activity ID can, for example, be globally unique within the database system.

In this example, the annotated query execution graph includes at least a base ID and one or more activity ID's. For example, if the query execution graph associated with query representation 132 includes an index read, configuration tool 107 would assign a base ID to the query execution graph and an activity ID to the index read. In some cases, configuration tool 107 can assign an activity ID to each action associated with a particular remote action. In other cases, configuration tool 107 can map each activity ID to one or more DLL's capable of performing the one or more actions associated with the activity ID. In this particular embodiment, configuration tool 107 assigns an activity ID for each remote action associated with the query execution graph. In this particular embodiment, the activity ID is capable of identifying the location of the appropriate DLL's to execute the action associated with the activity ID.

In various embodiments, configuration tool 107 can map the associated activity ID to a data file or table location within a database coupled to query module 106, such as, for example, second database system 112. In those cases, configuration tool 107 may include or have access to a table or index that identifies the location and/or content of data files or tables stored within or accessible to system 100. In this example, configuration tool 107 generates a compiled query 116 that includes an annotated query execution graph, one or more DLL's, and one or more helper files that are capable of resolving future and/or routine data requests on system 108.

In this example, query module 106 communicates compiled query 116 to first database system 108 through a communications link 124. Compiled query 116 may comprise, for example, software, code, portions of code, data compilations, and/or a combination of these or any other type of data or executables. In this example, compiled query 116 comprises an annotated query execution graph, one or more DLL's, and one or more helper files capable of resolving future and/or routine data requests on system 108. In some embodiments, compiled query 116 may be capable of updating and/or amending a pre-compiled query previously deployed to system 108.

In various embodiments, first database system 108 operates to deploy compiled query 116 on at least one of first nodes 110 as a pre-compiled query 118. In other embodiments, first database system 108 operates to deploy compiled query 116 on each of first nodes $110_1$-$110_M$. In this particular example, compiled query 116 is deployed on node $110_1$ as pre-compiled query 118. In that example, node $110_1$ distributes a copy of pre-compiled query 118 to each of nodes $110_2$-$110_M$. Although compiled query 116 is deployed to node $110_1$ in this example, compiled query 116 can be deployed to any or all of nodes $110_1$-$110_M$ without departing from the scope of the present disclosure.

In certain embodiments, node $110_1$ autonomically distributes pre-compiled query 118 to each of nodes $110_2$-$110_M$. In other embodiments, node $110_1$ can autonomically distribute and/or publish one or more top level keys 136, one or more keys or indices, system configuration data, and/or any other appropriate information to each of nodes $110_2$-$110_M$. In some cases, node $110_1$ can operate to dynamically create a distributed tree among nodes $110_1$-$110_M$. Although node $110_1$ autonomically distributes pre-compiled query 118 in this example, any or all of nodes $110_1$-$110_M$ can perform the desired functions without departing from the scope of the present disclosure. As used in this document, the phrase "dynamically creating" or "dynamically create" refers to the formation of a distributed tree that inter-connects a plurality of nodes for the distribution of a pre-compiled query and/or top level keys to such nodes. Moreover, each of the nodes inter-connected using the dynamically created distributed tree remains inter-connected for the duration of the distribution process. In other words, after completion of the distribution of the pre-compiled query and/or top level keys, at least one of the inter-connections between the nodes of the dynamically created distributed tree cease to exist.

In this particular embodiment, node $110_1$ operates to read the annotated query execution graph associated with pre-compiled query 118 and identify one or more data files or tables necessary to satisfy a particular action of pre-compiled query 118. Although node $110_1$ operates to read the query execution graph and identify one or more data files or tables in this example, any or all of node $110_1$-$110_M$ can perform the desired functions without departing from the scope of the present disclosure. In some cases, node $110_1$ can identify the one or more data files or tables using the mapping of each action to the one or more DLL's and/or data files or tables created by configuration tool 107. In other cases, node $110_1$ can identify the one or more data files or tables using the one or more helper files associated with pre-compiled query 118. In various embodiments, node $110_1$ may be capable of generating and/or communicating one or more data requests to acquire the necessary data from its permanent location, such as, for example second database system 112.

In this example, node $110_1$ of first database system 108 communicates one or more requests to acquire the necessary data from second nodes $114_1$-$114_N$ of second database system 112. Node $110_1$ communicates the one or more requests to second database system 112 through a communications link 126. In this example, second database system 112 receives and processes the one or more requests to communicate data necessary to resolve pre-compiled query 118. Second database system 112 then operates to pre-key first database system 108 by communicating copies of key parts $134_1$-$134_N$ and top level key 136 associated with each sorted table to first database system 108. As used throughout this document, the term "pre-key" or "pre-keyed" refers to deploying one or more key parts, one or more top level keys, and/or one or more indices on a database system in advance of or simultaneously with a user requesting data from such key parts or indices. One aspect of this disclosure recognizes that, in certain embodiments, deploying one or more pre-compiled queries and pre-keying a database system can increase the processing efficiency of the database system for routine and/or standard data requests.

Unlike conventional database systems that typically combine all the key parts into a single key or index, first database system 108 stores each individual key part 134 separately on an appropriate first node 110. In this example, first database system 108 distributes key parts 134 stored on second nodes 114 over first nodes 110. In some cases, the number of first nodes 110 of first database system 108 can be different than the number of second nodes 114 of second database system 112. In this particular embodiment, the number of first nodes 110 is less than the number of second nodes 114. Thus, at least some of nodes $110_1$-$110_M$ may store more than one key part 134. In various embodiments, each of key parts $134_1$-$134_N$ may be stored on more than one of first nodes $110_1$-$110_M$. One aspect of this disclosure recognizes that, in certain embodiments, storing copies of each key part 134 on multiple first nodes 110 enhances the systems reliability by providing redundancy which can minimize the effects of a single failure of a first node 110 on first database system 108.

In one non-limiting example, second database system 112 includes four-hundred second nodes $114_1$-$114_{400}$ and first database system 108 includes forty first nodes $110_1$-$110_{40}$. Although this example implements four-hundred second nodes 114 and forty first nodes 110, any number of second nodes 114 and first nodes 110 can be used without departing from the scope of the present disclosure. In that example, if each of second nodes $114_1$-$114_{400}$ store a respective key part $134_1$-$134_{400}$ associated with a sorted table, then first database system 108 would distribute each of those four-hundred key parts $134_1$-$134_{400}$ over first nodes $110_1$-$110_{40}$. In various embodiments, first database system 108 could distribute key parts $134_1$-$134_{400}$ such that first node $110_1$ receives key parts $134_1$, $134_{41}$, $134_{81}$, . . . $134_{361}$, from second nodes $114_1$, $114_{41}$, $114_{81}$, . . . $114_{361}$, and first node $110_{40}$ receives key parts $134_{40}$, $134_{80}$, $134_{120}$, . . . $134_{400}$ from second nodes $114_{40}$, $114_{80}$, $114_{120}$, . . . $114_{400}$. Moreover, first database system 108 could distribute key parts $134_1$-$134_{400}$ such that first node $110_1$ also receives key parts $134_{40}$, $134_{80}$, $134_{120}$, . . . $134_{400}$ from second nodes $114_{40}$, $114_{80}$, $114_{120}$, . . . $114_{400}$ to add redundancy to system 108. In some embodiments, first database system 108 could distribute key parts $134_1$-$134_{400}$ such that first node $110_1$ receives key parts $134_1$-$134_{10}$ from second nodes $114_1$-$114_{10}$, and first node $110_{40}$ receives key parts $134_{391}$-$134_{400}$ from second nodes $114_{391}$-$114_{400}$. In other embodiments, first database system 108 could distribute key parts $134_1$-$134_{400}$ in any other suitable manner.

In this example, second database system 112 also communicates top level keys 136 to node $110_1$ of first database system 108. In other embodiments, second database system 112 can communicate top level keys 136 to any or all of nodes $110_1$-$110_M$. In this particular embodiment, first node $110_1$ distributes top level key 136 to each of first nodes $110_2$-$110_M$. In other embodiments, any one of first nodes 110 may be capable of distributing top level key 136 to each of first nodes $110_1$-$110_M$. In certain embodiments, node $110_1$ autonomically distributes top level key 136 to each of nodes $110_2$-$110_M$. In some cases, node $110_1$ can operate to dynamically create a distributed tree among nodes $110_1$-$110_M$. Although node $110_1$ autonomically distributes top level key 136 in this example, any or all of nodes $110_1$-$110_M$ can perform the desired functions without departing from the scope of the present disclosure.

In this particular embodiment, system 108 operates to map the location of each key part $134_1$-$134_N$ from its respective second node 114 to one or more communication channels associated with first database system 108. In this example, a particular first node 110 that is processing a request to execute a particular pre-compiled query 118 operates to map the location of each key part $134_1$-$134_N$ from its respective second node 114 to one or more communication channels associated with first database system 108. In some cases, the particular node 110 may have access to one or more helper files or indices that may assist in mapping the location of each key part $134_1$-$134_N$ to one or more communication channels. In this example, each first node 110 has access to a function capable of mapping the location of key parts 134 to one or more channel numbers associated with database system 108, such as, for example, a modulus operation "part_no MOD num_channels" function. In that example, MOD represents the modulus operation, part_no the part number retrieved from the top level key and num_channels the number of channels.

In one non-limiting example, second database system 112 includes four-hundred second nodes $114_1$-$114_{400}$ and first database system 108 includes forty first nodes $110_1$-$110_{40}$. First database system 108 also includes forty communication channels capable of carrying a multicast communication signal to one or more first nodes $110_1$-$110_{40}$. Although this example implements forty communication channels within first database system 108, any number of communication channels can be used without departing from the scope of the present disclosure. In that example, each of second nodes $114_1$-$114_{400}$ store a key part 134 associated with a sorted table and first database system 108 distributes key parts $134_1$-$134_{400}$ such that first node $110_1$ receives key parts 134 from second nodes $114_1$, $114_{40}$, $114_{41}$, $114_{80}$, $114_{81}$, . . . $114_{400}$, and first node $110_{40}$ receives key parts 134 from second nodes $114_{40}$, $114_{80}$, $114_{120}$, . . . $114_{400}$. Thus, first node $110_1$ provides redundancy for at least the key parts 134 associated with second nodes $114_{40}$, $114_{80}$, $114_{120}$, . . . $114_{400}$.

In this particular non-limiting example, first node $110_1$ receives a request from a user to execute a particular pre-compiled query 118. In processing pre-compiled query 118, node $110_1$ identifies an action that necessitates the retrieval of a key part $134_{77}$ stored at least on nodes $110_{17}$ and $110_{27}$. First node $110_1$ access the appropriate top level key 136 for pre-compiled query $118_9$ and maps the location of key part $134_{77}$ from second node $114_{77}$ to a particular communication channel, such as channel fifteen. In this particular embodiment, both of nodes $110_{1,7}$ and $110_{2,7}$ are capable of receiving one or more requests at least on communication channel fifteen.

In the illustrated embodiment, system 100 includes at least communication links 120, 122, 124, 126, and 128 each operable to facilitate the communication of data and/or queries within system 100. Communications links 120, 122, 124, 126, and 128 may include any hardware, software, firmware, or combination thereof. In various embodiments, communications links 120, 122, 124, 126, and 128 may comprise communications media capable of assisting in the communication of analog and/or digital signals. Communications links 120, 122, 124, 126, and 128 may, for example, comprise a twisted-pair copper telephone line, a fiber optic line, a Digital Subscriber Line (DSL), a wireless link, a USB bus, a PCI bus, an ethernet interface, or any other suitable interface operable to assist in the communication within system 100.

In this embodiment, each of first database system 108 and second database system 112 comprises a separate database system. In an alternative embodiment, first database system 108 and second database system 112 could each be part of a common larger database system. Moreover, each of first nodes 110 could form part of second nodes 114.

In this particular embodiment, client 102 communicates query representation to second database system 112 through network 104. In an alternative embodiment, after query module 106 generates compiled query 116, query module 106 can communicate compiled query 116 to second database system 112 for processing. In that embodiment, query module 106 can communicate compiled query 116 to second database system through network 104.

Figure 2:
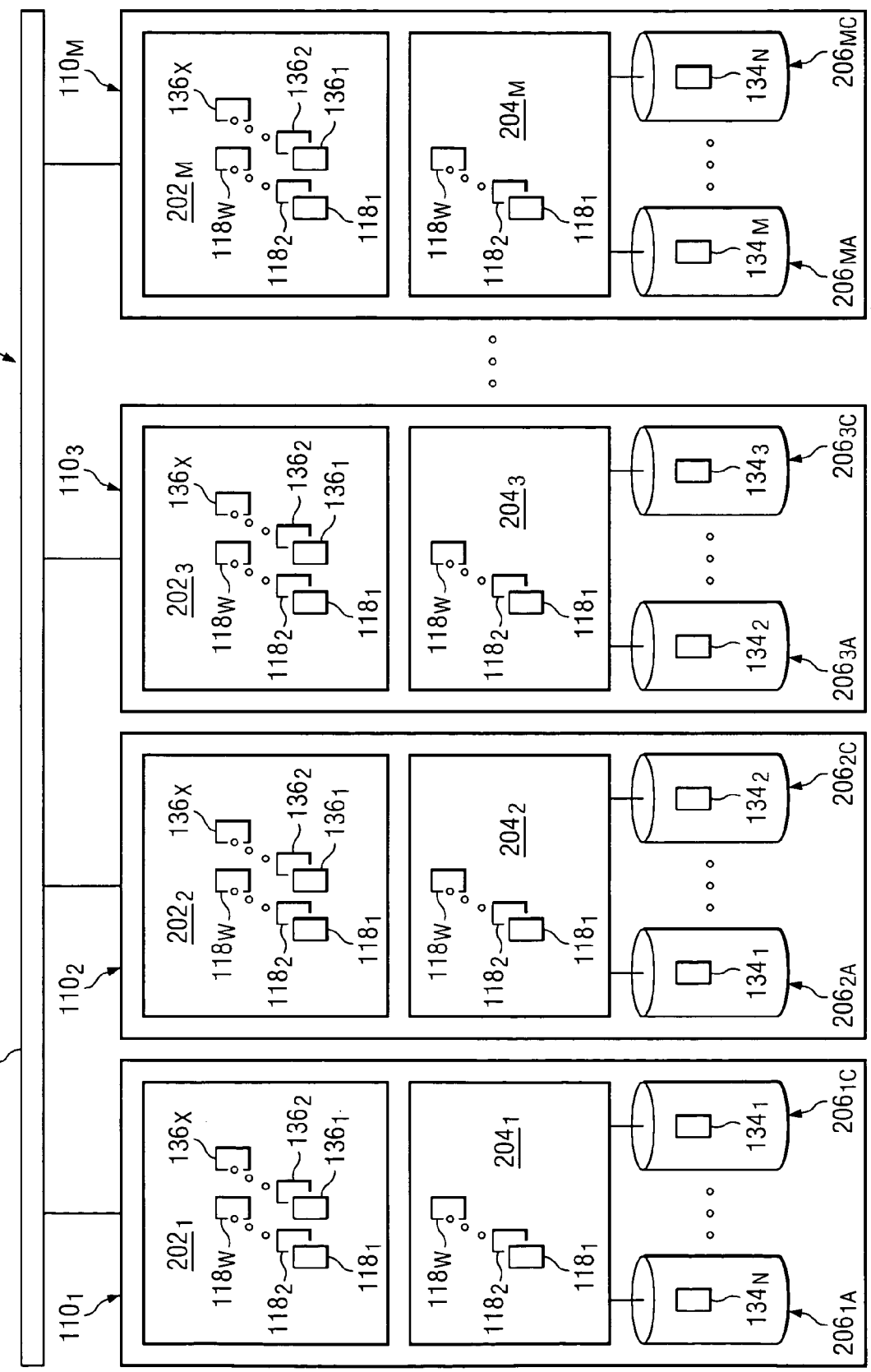
FIG. 2 is a block diagram of one embodiment of a database system capable of deploying a pre-compiled query and enhancing the reliability of the system.

FIG. 2 is a block diagram of one example embodiment of database system 108 capable of deploying one or more pre-compiled queries $118_1$-$118_W$ and enhancing the reliability of system 108. In this example, database system 108 operates to store pre-compiled queries $118_1$-$118_W$, key parts $134_1$-$134_N$ associated with one or more pre-compiled queries $118_1$-$118_W$, and one or more top level keys $136_1$-$136_X$ associated with pre-compiled queries $118_1$-$118_W$. Moreover, first database system 108 is capable of executing one or more pre-compiled queries $118_1$-$118_W$ upon receiving a request to execute a particular pre-compiled query 118 from a user of system 108. In this particular embodiment, each of pre-compiled queries $118_1$-$118_W$ comprises an annotated execution graph, one or more DLL's, and/or one or more helper files.

In this particular embodiment, each of pre-compiled queries $118_1$-$118_W$ is capable of resolving one or more routine and/or standard data requests that may have variations in input variables. For example, pre-compiled query $118_2$ may be capable of returning one or more desired addresses or range of addresses when any combination of one or more first names, one or more last names, or one or more social security numbers are provided to first database system 108, while pre-compiled query $118_3$ may be capable of returning a first name, last name, and state of registration, for all owners of one or more specific make, model, year, and/or color of one or more vehicles. One aspect of this disclosure recognizes that, in certain embodiments, deploying pre-compiled queries $118_1$-$118_W$ can increase the processing efficiency of first database system 108 for routine and/or standard data requests that have a number of variations on the input parameters.

In this example, database system 108 comprises a parallel-processing database that includes a plurality of nodes $110_1$-$110_M$. Each of nodes $110_1$-$110_M$ of first database system includes a master node 202, a slave node 204, and one or more memory modules 206. Although each of nodes $110_1$-$110_M$ includes master node 202, slave node 204, and one or more memory modules 206 in this example, each of nodes 110 may include any other appropriate device, or may exclude one or more of master node 202, slave node 204, or memory module 206 without departing from the scope of the present disclosure. In this particular embodiment, the number of master nodes 202 is the same as the number of slave nodes 204. In some embodiments, the number of slave nodes 204 can be larger than the number of master nodes 202. In other embodiments, the number of master nodes 202 can be larger than the number of slave nodes 204.

System 108 deploys pre-compiled queries $118_1$-$118_W$ and top level keys $136_1$-$136_X$ on master node $202_1$. Although pre-compiled queries $118_1$-$118_W$ and top level keys $136_1$-$136_X$ are deployed on master node $202_1$ in this example, pre-compiled queries and top level keys can be deployed on any one or all of master nodes $202_2$-$202_M$ without departing from the scope of the present disclosure. In other embodiments, system 108 can deploy each of pre-compiled queries $118_1$-$118_W$ and top level keys $136_1$-$136_X$ on each of master nodes $202_1$-$202_M$. In this example, master node $202_1$ distributes a copy of pre-compiled queries $118_1$-$118_W$ to each of the other master nodes $202_2$-$202_M$ and to each of slave nodes $204_1$-$204_M$. In some embodiments, master node $202_1$ can distribute a copy of the one or more DLL's and/or one or more helper files associated with each of pre-compiled queries $118_1$-$118_W$ to slave nodes $204_1$-$204_M$.

In this particular embodiment, master node $202_1$ autonomically distributes a particular pre-compiled query 118, such as pre-compiled query $118_2$, to each of master nodes $202_2$-$202_M$ and each of slave nodes $204_1$-$204_M$. Moreover, master node $202_1$ autonomically distributes one or more top level keys 136 associated with the particular pre-compiled query 118 to each of master nodes $202_2$-$202_M$. Although master node $202_1$ autonomically distributes a particular pre-compiled query 118 and associated top level keys 136 in this example, any or all of master nodes $202_2$-$202_M$ can perform the desired functions without departing from the scope of the present disclosure.

In some cases, master node $202_1$ can operate to dynamically create one or more distributed trees that inter-connect master nodes $202_2$-$202_M$ to distribute the particular pre-compiled query 118 and associated top level keys 136. In other cases, master node $202_1$ can operate to dynamically create one or more distributed trees that inter-connect master nodes $202_2$-$202_M$ and slave nodes $204_1$-$204_M$ to distribute the particular pre-compiled query 118. In this example, after distribution of the particular pre-compiled query 118 and associated top level keys 136 to each of master nodes $202_2$-$202_M$, the inter-connections between master nodes $202_2$-$202_M$ that enabled the distributed tree cease to exist.

In this example, each of master nodes $202_1$-$202_M$ is capable of executing each of pre-compiled queries $118_1$-$118_W$ upon receiving a request from a user of system 108. Moreover, each of master nodes $202_1$-$202_M$ is capable of mapping the location of each key part $134_1$-$134_N$ from its respective second node 114 to one or more communication channels associated with system 108. In some cases, each of master nodes $202_1$-$202_M$ has access to one or more functions capable of mapping the location of key parts 134 to one or more channel numbers, such as, for example, a modulus operation "part_no MOD num_channels" function. Master nodes $202_1$-$202_M$ may comprise any device or combination of devices that may include one or more hardware, software, and/or firmware modules. In this particular embodiment, each master node $202_1$-$202_M$ includes or has access to a memory that stores each pre-compiled query $118_1$-$118_W$ deployed on system 108 and each top level key $136_1$-$136_X$ associated with each deployed pre-compiled query $118_1$-$118_W$.

In this example, each of master nodes $202_1$-$202_M$ is capable of reading the annotated query execution graph corresponding to a particular pre-compiled query $118_1$-$118_W$. In some embodiments, a particular master node 202 can determine that a particular pre-compiled query 118 can be fully executed on the master node 202. In other embodiments, a particular master node 202 can determine that a particular pre-compiled query 118 calls for one or more remote actions and the interaction of one or more slave nodes $204_1$-$204_M$. The remote actions can comprise, for example, an index read, a record read, an aggregation, or any other action that calls for the use of one or more slave nodes 204. In some cases, the particular master node 202 can determine whether the annotated query graph calls for a remote action by the activity ID assigned to each action for a particular pre-compiled query 118 by configuration tool 107 of FIG. 1.

Each master node $202_1$-$202_M$ is further capable of communicating one or more requests to perform particular actions associated with a particular pre-compiled query 118, such as, a request to perform an index read, to one or more slave nodes $204_1$-$204_M$ (e.g., on the same or on different node 110 as the master node) for processing in accordance with one or more of pre-compiled queries $118_1$-$118_W$. In various embodiments, each master node $202_1$-$202_M$ is capable of communicating the request to perform a particular action using a multicast signal formatted in, for example, User Datagram Protocol (UDP).

In this example, master node $202_1$ determines that a particular pre-compiled query 118 calls for one or more remote actions and communicates one or more requests to perform particular actions associated with a particular pre-compiled query 118 to one or more of slave nodes $204_1$-$204_M$. Although master node $202_1$ performs the functions in this example, any of master nodes $202_1$-$202_M$ can perform the functions without departing from the scope of the present disclosure. In some embodiments, the request to perform a particular action can include, for example, one or more variables associated with the request supplied by a user of system 108. In other embodiments, the request to perform a particular action can include, for example, an activity ID identifying the particular action (e.g., an index read) that a particular master node 202 is requesting the one or more slave nodes 204 to perform. For example, the activity ID may direct the one or more slave nodes 204 to the location of particular DLL's associated with the particular pre-compiled query 118.

In certain embodiments, master node $202_1$ can assign a transaction ID to the request, so that when the one or more slave nodes $204_1$-$204_M$ return results to master node $202_1$, master node $202_1$ will be able to match the returned results to the appropriate request. Each request may also include one or more of: (a) a master node identifier indicating which master node 202 sent the request; (b) an indication of the communication channel on which master node 202 communicated the respective request package; and (c) an indication of whether there have been any retries for the one or more actions associated with the request. The request may include any other suitable information or data, according to particular needs. Certain of the information in the request may be included in a header portion of the request. In various embodiments, each request to perform a particular action associated with a particular pre-compiled query 118 may include a maximum transmission unit (MTU) worth of data, such as, for example, 1500 octets (e.g., eight-bit bytes) of data or 576 octets of data.

One aspect of this disclosure recognizes that the use of multicast signals can allow each of master nodes $202_1$-$202_M$ to communicate a single request to multiple slave nodes $204_1$-$204_M$ that are capable of receiving a request on a particular channel. In some cases, communicating a multicast signal to multiple slave nodes can reduce the communication bandwidth associated with communicating the request to perform a particular action of a particular pre-compiled query 118 when multiple slave nodes $204_1$-$204_M$ have access to a particular key part. That is, rather than communicating separate requests to each of slave nodes $204_1$-$204_M$ having access to a particular key part 134, each master node 202 can communicate one request using a multicast format to each slave node $204_1$-$204_M$ having access to that particular key part 134.

In this example, each slave node $204_1$-$204_M$ is capable of storing each pre-compiled query 118 received from a particular master node 202. In other embodiments, each of slave nodes $204_1$-$204_M$ can store the one or more helper files and the DLL's associated with each pre-compiled query 118. Each of slave nodes $204_1$-$204_M$ is also capable of reading one or more requests to perform particular actions associated with a particular pre-compiled query 118. In certain embodiments, each of slave nodes $204_1$-$204_M$ can read the one or more requests and determine the particular action associated with each of the requests. For example, each of slave nodes $204_1$-$204_M$ can determine particular action based at least in part on the activity ID assigned to each action. In other embodiments, each of slave nodes $204_1$-$204_M$ can read the one or more requests and identify the one or more variables associated with the request supplied by a user of system 108. For example, each of slave nodes $204_1$-$204_M$ can identify the one or more variables accessing one or more helper files capable of deserializing the one or more variables from the request. Slave nodes $204_1$-$204_M$ may comprise any device or combination of devices that may include one or more hardware, software, and/or firmware modules.

Each of slave nodes $204_1$-$204_M$ is further capable of processing the one or more requests to perform one or more particular actions associated with a particular pre-compiled query 118. In some embodiments, each of slave nodes $204_1$-$204_M$ may have access to and/or include one or more helper files that may assist each of slave nodes $204_1$-$204_M$ in processing a request to perform one or more particular actions. In certain embodiments, the one or more helper files may assist in processing a request by directing a particular slave node 204 to the location of particular DLL's associated with an activity ID. In other embodiments, the one or more helper files may assist in identifying and processing the one or more variables associated with the request.

In this example, each of slave nodes $204_1$-$204_M$ has access to a plurality of memory modules 206 capable of storing one or more key parts 134. In other embodiments, each of slave nodes $204_1$-$204_M$ may include one or more memory modules 206. Memory modules 206 may include any hardware, software, firmware, or combination thereof operable to store and facilitate retrieval of information. Each memory module 206 may store information using any of a variety of data structures, arrangements, and/or compilations. Memory module 206 may, for example, include a hard disk, a dynamic random access memory (DRAM), a static random access memory (SRAM), or any other suitable volatile or nonvolatile storage and retrieval device or combination of devices.

In this example, each of slave nodes $204_1$-$204_M$ is capable of receiving multicast signals from at least one communication channel. In most cases, the larger the number of slave nodes 204 capable of receiving a multicast signal from a particular communication channel, the greater the redundancy of the system. In various embodiments, each communication channel may be associated with, for example, two slave nodes 204, four slave nodes 204, or any other appropriate number of slave nodes 204.

In various embodiments, system 108 can implement a plurality of communication channels by, for example, assigning a different multicast IP address to each of the plurality of channels. In some embodiments, each of slave nodes $204_1$-$204_M$ may register to receive multicast signals from a plurality of communication channels by, for example, registering with a switch or a router coupled to network 226. In other embodiments, each of slave nodes $204_1$-$204_M$ may register to receive multicast signals from particular communication channels based at least in part on the key parts 134 accessible to and/or stored on the particular slave node 204.

In this particular embodiment, each of slave nodes $204_1$-$204_M$ operates to store and/or provide access to key parts 134 associated with at least another one of slave nodes $204_1$-$204_M$. For example, slave node $204_2$ may store and/or provide access to key parts $134_1$ and $134_2$, while slave node $204_3$ may store and/or provide access to key parts $134_2$ and $134_3$. In various embodiments, each of slave nodes $204_1$-$204_M$ may be capable of receiving multicast signals on more than one communication channel. Thus, slave node $204_2$ may operate to receive multicast communication signals on communication channel one and channel two, and to store and/or provide access to key parts $134_1$ and $134_2$. Meanwhile, slave node $204_3$ operates receive multicast communication signals from communication channels two and channel three, and to store and/or provide access to key parts $134_2$ and $134_3$. Thus, slave nodes $204_2$ and $204_3$ each receive a multicast signal communicated on channel two, and store and/or provide access to data associated with key parts $134_2$ and thereby add redundancy to system 108.

In various embodiments, system 108 is configured such that each of slave nodes $204_1$-$204_M$ that receive multicast signals from a particular communication channel and that store and/or provide access to a particular key part 134 are not susceptible to a single point of failure. One aspect of this disclosure recognizes that, in certain embodiments, storing copies of each key part 134 on multiple slave nodes 204 that are capable of receiving a multicast signal on a particular communication channel enhances the systems reliability by providing system redundancy. In most cases, the provision of system redundancy can minimize the effects of a single failure of a particular slave node 204 on first database system 108.

In this example, a network 226 couples each of nodes 110 to each other. Network 226 may comprise any wireless network, wireline network, or combination of wireless and wireline networks capable of supporting communication between network elements. For example, network 226 may comprise a data network, a public switched telephone network (PSTN), an integrated services digital network (ISDN), a local area network (LAN), a wide area network (WAN), a metropolitan area network (MAN), all or a portion of the global computer network known as the Internet, and/or other communication systems or combination of communication systems at one or more locations. In various embodiments, network 226 is capable of transmitting information from master nodes $202_1$-$202_M$ to one or more slave nodes $204_1$-$204_M$ over a plurality of communication channels. In this particular embodiment, network 226 includes a switching module capable of routing multicast signals to particular slave nodes 204.

In one non-limiting example, system 108 includes forty master nodes $202_1$-$202_{40}$ and forty slave nodes $204_1$-$204_{40}$. Although this example includes forty master nodes 202 and slave nodes 204, any number of slave nodes and master nodes may be used without departing from the scope of the present disclosure. Moreover, in this example, system 108 includes or has access to forty communication channels. In other embodiments, system 108 may include, for example, two communication channels, ten communication channels, twenty communication channels, or more.

In operation, first database system 108 deploys one or more pre-compiled queries $118_1$-$118_W$, one or more top level keys $136_1$-$136_X$, and a plurality of key parts $134_1$-$134_N$ necessary to resolve pre-compiled queries $118_1$-$118_W$ to nodes $110_1$-$110_M$. In this particular embodiment, system 108 distributes and stores each of pre-compiled queries $118_1$-$118_W$ on each of master nodes $202_1$-$202_M$ and slave nodes $204_1$-$204_M$. First database system 108 also executes one or more of pre-compiled queries $118_1$-$118_W$ upon receiving a request to execute a particular pre-compiled query 118 from a user of system 108. In some cases, the request to execute a particular pre-compiled query can be received by first database system 108 from a client, such as client 102 of FIG. 1. In various embodiments, a user can request execution of a particular pre-compiled query 118 by connecting to system 108 through any appropriate means, such as through a host coupled to system 108.

In one particular example, system 108 receives a plurality of requests from one or more users of system 108 to execute pre-compiled query $118_2$. In that example, pre-compiled query $118_2$ operates to return one or more desired addresses when any combination of one or more first names, one or more last names, and one or more social security numbers are provided in a request to system 108.

In one particular non-limiting example, a first user of system 108 provides a first request that seeks to have pre-compiled query $118_2$ return one or more desired addresses for all persons named Chad Thomas. A second user of system 108 provides a second request that seeks to have pre-compiled query $118_2$ return a plurality of addresses for all the social security numbers within a particular range of numbers (e.g., from 111-22-3333 to 111-22-3417).

In most cases, system 108 selects only one of master nodes $202_1$-$202_M$ to receive a request from a user and to execute the particular pre-compiled query 118 that resolves the user's request. In one particular non-limiting example, system 108 selects master node $202_3$ to process the first request received from the first user, and selects master node $202_4$ to process the second request received from the second user. Although system 108 selects master nodes $202_3$ and $202_4$ to process the requests in this example, any of master nodes $202_1$-$202_M$ could receive and process the requests without departing from the scope of the present disclosure.

In this example, each of master nodes $202_3$ and $202_4$ reads the annotated query execution graph of pre-compiled query $118_2$ and determines whether any of the actions associated with pre-compiled query $118_2$ requires a remote action. In some embodiments, master nodes $202_3$ and $202_4$ determine that pre-compiled query $118_2$ can be fully executed on master nodes $202_3$ and $202_4$. In this particular embodiment, master nodes $202_3$ and $202_4$ determine that query $118_2$ calls for one or more remote actions and the interaction of one or more slave nodes $204_1$-$204_M$. The remote actions can comprise, for example, an index read, a record read, an aggregation, or any other action that calls for the use of one or more slave nodes 204. In some cases, master nodes $202_3$ and $202_4$ can determine whether the annotated query graph calls for a remote action by the activity ID assigned to each action for pre-compiled query $118_2$ by configuration tool 107 of FIG. 1.

In this example, each of master nodes $202_3$ and $202_4$ reads the annotated query execution graph associated with pre-compiled query $118_2$ and determines that pre-compiled query $118_2$ calls for an index read of at least one key part 134. In this particular example, master node $202_3$ determines that an action associated with resolving the first request calls for an index read for all persons having the first name Chad and an index read for all the Chad's that have a last name that is phonetically similar to Thomas. Consequently, master node $202_3$ determines that pre-compiled query $118_2$ calls for index reads of key parts $134_{17}$ and $134_{18}$ to resolve the first request. Meanwhile, master node $202_4$ determines that addresses associated with social security numbers between 111-22-3333 and 111-22-3385 are located on key part $134_{20}$ and that addresses associated with social security numbers between 111-22-3386 and 111-22-3417 are located on key part $134_{21}$. Thus, master node $202_4$ determines that pre-compiled query $118_2$ calls for index reads of key parts $134_{20}$ and $134_{21}$ to resolve the second request.

To communicate a request to perform a particular action using key parts $134_{17}$, $134_{18}$, $134_{20}$, and $134_{21}$, each of master nodes $202_3$ and $202_4$ maps each of key parts $134_{17}$, $134_{18}$, $134_{20}$, and $134_{21}$ to one or more communication channels using, for example, a modulus operation "part_no MOD num_channels" function. In this example, master node $202_3$ maps the location of key parts $134_{17}$ and $134_{18}$ from second nodes $114_{17}$ and $114_{18}$ to communication channels seventeen and eighteen, respectively. Master node $202_4$ maps the location of key parts $134_{20}$ and $134_{21}$ from second nodes $114_{20}$ and $114_{21}$ to communication channels twenty and twenty-one, respectively.

In this example, master node $202_3$ communicates one or more requests for an index read of key parts $134_{17}$ and $134_{18}$ on each of communication channels seventeen and eighteen, while master node $202_4$ communicates a one or more requests for an index read of key parts $134_{20}$ and $134_{21}$ on each of communication channels twenty and twenty-one. In this particular embodiment, each of master nodes $202_3$ and $202_4$ communicates the requests to perform the particular actions associated with pre-compiled query $118_2$ using a multicast signal format. Each of master nodes $202_3$ and $202_4$ communicates the multicast signals to all of slave nodes $204_1$-$204_M$ that are capable of receiving signals on the appropriate communication channels.

In this particular example, the one or more requests for an index read communicated by master nodes $202_3$ and $202_4$ comprise a request packet. Each request packet includes at least an activity ID identifying the particular action that master nodes $202_3$ and $202_4$ are requesting the one or more slave nodes 204 to perform. In some cases, the activity ID may direct the one or more slave nodes 204 to the location of particular DLL's associated with pre-compiled query $118_2$. In certain embodiments, the request packet may include, for example, the one or more variables associated with each of the first and second requests provided by the first and second users of system 108. Moreover, the request packet can include, for example, a transaction ID that enables each of master $202_3$ and $202_4$ to identify any results returned after processing by the one or more slave nodes $204_1$-$204_M$.

In this particular embodiment, slave nodes $204_6$ and $204_{16}$ operate to store and/or provide access to key part $134_{17}$, and slave nodes $204_2$ and $204_{16}$ operate to store and/or provide access to key part $134_{18}$. Moreover, slave nodes $204_6$ and $204_{16}$ are capable of receiving requests on communication channel seventeen, and slave nodes $204_2$ and $204_{16}$ are capable of receiving requests on communication channel eighteen. In this particular example, master node $202_3$ communicates one or more requests in one or more multicast signals on communication channel seventeen to each of slave nodes $204_6$ and $204_{16}$ and on communication channel eighteen to each of slave nodes $204_2$ and $204_{16}$.

In this example, at least one of slave nodes $204_6$ and $204_{16}$ processes the multicast signal communicated on communication channel seventeen, while at least one of slave nodes $204_2$ and $204_{16}$ processes the multicast signal communicated on communication channel eighteen. In one particular example, slave node $204_{16}$ processes the multicast signal communicated on communication channel seventeen and slave node $204_2$ processes the multicast signal communicated on communication channel eighteen. Upon receiving the multicast signals from communication channels seventeen and eighteen, each of slave nodes $204_{16}$ and $204_2$ operates to read the request packet associated with the respective multicast signals.

In this example, each of slave nodes $204_{16}$ and $204_2$ reads the request packet and identifies an activity ID that operates to perform a first index read on a first name and a second index read on phonetically similar last names. Moreover, each of slave nodes $204_{16}$ and $204_2$ reads the request packet and identifies the one or more variables to be used in processing the request. Each of slave nodes $204_{16}$ and $204_2$ processes the respective multicast signal using one or more DLL's associated with the particular activity ID. For example, slave node $204_{16}$ may processes the multicast signal communicated on channel seventeen by using and/or deserializing the one or more variables supplied by the first user of system 108 and executing one or more DLL's associated with pre-compiled query $118_2$. In certain embodiments, each of slave nodes $204_{16}$ and $204_2$ may have access to one or more helper files capable of directing each of slave nodes $204_{16}$ and $204_2$ to the location of particular DLL's associated with the activity ID. In other embodiments, each of slave nodes $204_{16}$ and $204_2$ may have access to one or more helper files capable of assisting in the identification of the one or more variables to be used in processing the request.

In this particular embodiment, slave nodes $204_1$ and $204_{11}$ operate to store and/or provide access to key part $134_{20}$, and slave nodes $204_{22}$ and $204_{34}$ operate to store and/or provide access to key part $134_{21}$. Moreover, slave nodes $204_1$ and $204_{11}$ are capable of receiving requests on communication channel twenty, and slave nodes $204_{22}$ and $204_{34}$ are capable of receiving requests on communication channel twenty-one. In this particular example, master node $202_4$ communicates a request in a multicast signal on communication channel twenty to each of slave nodes $204_1$ and $204_{11}$ and another request in a multicast signal on communication channel twenty-one to each of slave nodes $204_{22}$ and $204_{34}$.

In this example, at least one of slave nodes $204_1$ and $204_{11}$ processes the request communicated on communication channel twenty, while at least one of slave nodes $204_{22}$ and $204_{34}$ processes the request communicated on communication channel twenty-one. In one particular embodiment, slave node $204_1$ processes the request communicated on communication channel twenty, while slave node $204_{34}$ processes the request communicated on communication channel twenty-one. Upon receiving the multicast signals from communication channels twenty and twenty-one, each of slave nodes $204_1$ and $204_{34}$ operates to read the request packet associated with the respective multicast signals.

In this example, each of slave nodes $204_1$ and $204_{34}$ reads the request packet and identifies an activity ID that operates to perform an index read on a range of social security numbers. Moreover, each of slave nodes $204_1$ and $204_{34}$ reads the request packet and identifies the one or more variables to be used in processing the request. Each of slave nodes $204_1$ and $204_{34}$ processes the respective multicast signal using one or more DLL's associated with the particular activity ID. For example, slave node $204_1$ may processes the multicast signal communicated on channel twenty by using the one or more variables supplied by the second user of system 108 and executing one or more DLL's associated with pre-compiled query 118₂. In certain embodiments, each of slave nodes 204₁ and 204₃₄ may have access to one or more helper files capable of directing each of slave nodes 204₁ and 204₃₄ to the location of particular DLL's associated with the activity ID. In other embodiments, each of slave nodes 204₁ and 204₃₄ may have access to one or more helper files capable of assisting in the identification of the one or more variables to be used in processing the request.

In this example, each of slave nodes 204₁₆ and 204₂ operate to return the addresses for all persons having the first name Chad and a last name phonetically similar to Thomas and slave node to master node 202₃ for further processing according to the query execution graph of pre-compiled query 118₂. Moreover, slave node 204₁ returns the addresses for all persons having a social security number between 111-22-3333 and 111-22-3385 and slave node 204₃₄ returns all persons having a social security number between 111-22-3386 and 111-22-3417 to master node 202₄ for further processing according to the query execution graph of pre-compiled query 118₂.

Figures 3, 4:
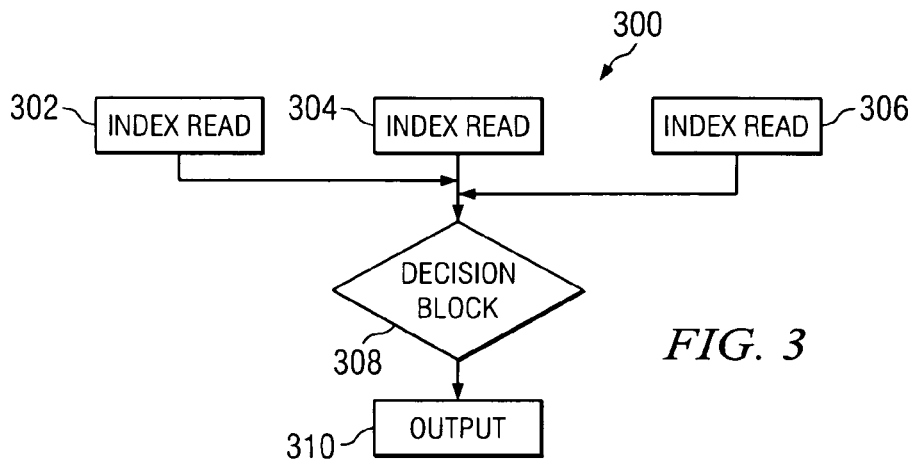
FIG. 3 is a block diagram of one embodiment of an execution graph associated with a pre-compiled query.
FIG. 4 is one embodiment of a plurality of key parts associated with a sorted table.

FIG. 3 is a block diagram of one embodiment of a query execution graph 300 associated with an example pre-compiled query 118. FIG. 3 illustrates just one example embodiment of a query execution graph. It should be appreciated that other embodiments of a query execution graph may be used without departing from the scope of the present disclosure. In this example, query execution graph 300 includes five actions 302-310. Although query execution graph 300 includes five actions 302-310 in this example, query execution graph 300 could include any other number of actions without departing from the scope of the present disclosure.

In various embodiments, query execution graph 300 includes actions 302-306, each capable of providing one or more desired responses or ranges of responses upon receiving a set of input variables. Actions 302-306 can comprise, for example, remote actions, local actions, and/or a combination of remote and local actions. As used throughout this document, the term "remote action" or "remote actions" refers to a particular action within a pre-compiled query that calls for the execution of at least a portion of that action on one or more slave nodes. A "local action" is a particular action within a pre-compiled query that is executed on the master node processing the pre-compiled query.

In this particular embodiment, each of actions 302-306 comprises one or more remote actions, such as, for example, one or more index reads, one or more record reads, one or more aggregations, or any other action that necessitates the use of one or more slave nodes. Moreover, each of actions 302-306 has access to one or more associated DLL's and/or helper files capable of assisting a master node 202 or slave node 204 in processing the one or more remote actions associated with actions 302-306.

In this example, actions 308-310 comprise one or more local actions, such as, for example, a one or more sorts, one or more deduping, one or more roll ups, or any other action capable of being performed on the master node that received the request. Each of actions 308-310 has access to one or more associated DLL's and/or helper files capable of assisting a master node 202 in processing the one or more local actions associated with actions 308-310.

In one non-limiting example, query execution graph 300 illustrates a pre-compiled query capable of returning one or more desired addresses or range of addresses when any combination of one or more first names, one or more last names, or one or more social security numbers are provided by a user of a database system, such as system 108 of FIG. 2. In that example, action 302 is capable of returning one or more desired addresses when a user inputs a first name and last name, while action 304 is capable of returning one or more desired addresses when a user inputs a range social security number. Moreover, action 306 is capable of returning one or more desired addresses when a user inputs one or more last names.

In that example, action 308 operates to determine which inputs have been provided by the user and to select an appropriate one of actions 302-306 to resolve the user's request. In various embodiments, action 308 includes or has access to logic that enables action 308 to determine the best action 302-306 to use in resolving the user's request. In some cases, action 308 can include logic that determines the probability of each action 302-306 returning the desired address based on the inputs and selects the action with the highest probability. For example, the logic could indicate that when a social security number and a last name are provided, implementing action 304 is most likely to return the desired address. In this example, action 310 operates to provide an output signal that includes the desired address to the user.

FIG. 4 is one embodiment of a sorted table 400 that includes a plurality of key parts 434. FIG. 4 illustrates just one example embodiment of a sorted table. It should be appreciated that other embodiments of a sorted table may be used without departing from the scope of the present disclosure. In this example, sorted table 400 includes four fields 402-408. Although sorted table 400 include four fields 402-408 in this example, sorted table 400 could include any other number of fields without departing from the scope of the present disclosure.

In one non-limiting example, sorted table 400 is sorted by first field 402, which includes a name first name for a plurality of data entries. Sorted table 400 is then sorted by Second field 404, which includes a last name that is associated with the first name of the respective data entry. Finally, sorted table 400 is sorted by third field 406, which includes an address associated with the respective entry. Fourth field 408 can include any data entry identifier 408, such as, for example, the position of the data entry within the sorted database, a pointer to the location of additional data, or any other appropriate data entry identifier. In other embodiments, third field 406 can include a pointer to the location of the desired address that is stored in another table.

Fields 402-406 of sorted table 400 can be populated with data generated by and/or stored on a database system, such as second database system 112 of FIG. 1. In this particular example, fields 402-406 are populated with data sorted on a database system after receiving a request to generate a sorted table for use in resolving at least a portion of a pre-compiled query. In that example, the pre-compiled query is capable of returning one or more desired addresses when a first name and last name are provided to a database system, such as first database system 108 of FIG. 1.

In most cases, the one or more sorts of data result in sorted table 400 being distributed over one or more of second nodes 114₁-114ₙ as key parts 434ₐ-434ₙ. In this particular example, first key part 434ₐ includes the addresses for names ranging from Aaron Aaskey to Chad Thomas, second key part 434ᵦ includes the addresses for the names ranging from Chad Tomas to Connor McConnell, and last key part 434ₙ includes addresses for the names Yen Lee to Zack Zymol.

In this particular example, after key part 434ₐ-434ₙ are populated with data generated by and/or stored on a database, each of key parts 434ₐ-434ₙ is communicated to another database system, such as database system 108 of FIG. 2, for use in resolving a request to execute a pre-compiled query. In some cases, a particular pre-compiled query can use sorted table 400 to identify one or more addresses for all persons having the first name Chad and that have a last name that is phonetically similar to Thomas. In that case, the particular pre-compiled query uses key parts 434*a* and 434*b* to identify the addresses of at least Chad Thomas and Chad Tomas.

Figures 5, 6:
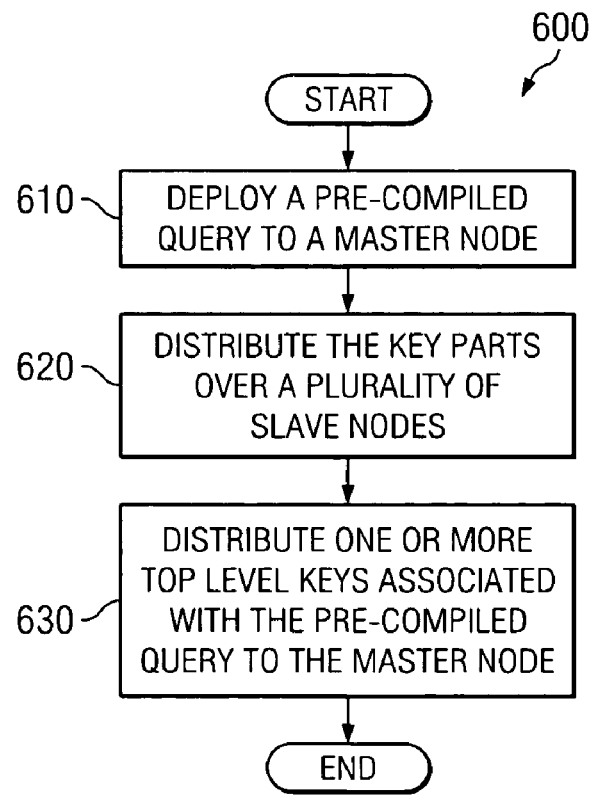
FIG. 5 is one embodiment of a top level key associated with a sorted table before deployment to a database system.
FIG. 6 is a flow chart illustrating an exemplary method for deploying a pre-compiled query and pre-keying a database.

FIG. 5 is one embodiment of a top level key 536 associated with a sorted table. FIG. 5 illustrates just one example embodiment of a top level key associated with a sorted table, such as table 400 of FIG. 4. It should be appreciated that other embodiments of a top level key may be used without departing from the scope of the present disclosure. In this example, top level key 536 includes four fields 502-508. Although top level key 536 includes four fields 502-508 in this example, top level key 536 could include any other number of fields without departing from the scope of the present disclosure.

In one non-limiting example, a database system, such as second database system 112 of FIG. 1, generates top level key 536. Top level key 536 includes a first field 502, which includes a first name for a plurality of data entries. Second field 504 includes a last name that is associated with the first name of the respective data entry; while third field 506 includes an address associated with the respective entry. Fourth field 508 can include any key part location identifier, such as, for example, the identification of the respective node, such as node 114 of FIG. 1, that stores the key part.

In this example, top level key 536 operates to identify the location within a database system of each key part associated with a sorted table. In this particular example, fields 502-506 are populated with data from the sorted table for use with a particular pre-compiled query of a database system, such as first database system 108 of FIG. 2. In that example, the particular pre-compiled query is capable of returning one or more desired address when one or more first names and one or more last names are provided to the a database system.

In this example, fields 502-506 of top level key 536 identify the last data entry of a particular key part, such as key parts 434$_a$-434$_n$ of FIG. 4, associated with a sorted table. Fourth field 508 identifies the location of the last data entry for the particular key part, such as a particular second node 114 of FIG. 1. For example, top level key 536 can be used to identify that all the names following Chad Thomas up to and including Connor McConnell are located on node 114$_2$ of second database system 112 of FIG. 1. Consequently, top level key 536 identifies the location of each data entry within a sorted table.

In this particular example, after top level key 536 is created, top level key 536 is communicated to another database system, such as database system 108 of FIG. 2, for use in resolving a request to execute a pre-compiled query. In some cases, a particular pre-compiled query can use top level key 536 to identify the location of one or more key parts within a database system. In this example, the database system operates to map the location of each key part from its respective second node 114 to one or more communication channels associated with the database system. In some cases, the database system may include or have access to one or more functions capable of mapping the location of the key parts to one or more channel numbers associated with the database system, such as, for example, a modulus operation "part_no MOD num_channels" function.

FIG. 6 is a flow chart illustrating an exemplary method 600 for deploying a pre-compiled query and pre-keying a database system. In one particular embodiment, a database system may deploy a pre-compiled and may be pre-keyed by system 100 and/or system 108 of FIG. 2. Although system 108 is used in this example, other systems may be used without departing from the scope of the present disclosure.

In this embodiment, a user of system 100 generates a query that is capable of resolving routine and/or standard data requests that are capable of having variations in input parameters. Query module 106 receives representation 132 of the query generated by the user and creates compiled query 116 that includes an annotated execution graph, one or more executables, and/or one or more software files. In this example, second database system 112 also receives a copy of query representation 132 and performs one or more sorts on portions of data stored on second database system 112. In this embodiment, the sorts of the data files on second database system 112 results in the formation of one or more sorted tables that are distributed over a plurality of second nodes 114$_1$-114$_N$ of FIG. 1. Moreover, the sort of the data within second database system 112 creates a plurality of key parts 134$_1$-134$_N$ and a top level key 136 for each sorted table.

In this example, method 600 begins at step 610 where at least one pre-compiled query 118 is deployed on at least one of nodes 110$_1$-110$_M$ of system 108 of FIG. 1. In this particular embodiment, pre-compiled query 118 is deployed on master node 202$_1$ of node 110$_1$ of FIG. 2. Master node 202$_1$ operates to distribute pre-compiled query 118 to each of master nodes 202$_2$-202$_M$ and each of slave nodes 204$_1$-204$_M$. In that embodiment, master node 202$_1$ operates to read the annotated query execution graph associated with pre-compiled query 118 and identify one or more data files or tables necessary to satisfy a particular action of pre-compiled query 118. In some cases, node 202$_1$ can identify the one or more data files or tables using the mapping of each action to the one or more DLL's and/or data files or tables created by configuration tool 107 of FIG. 1.

In this example, after master node 202$_1$ reads the annotated query execution graph, master node 202$_1$ communicates one or more data requests to a database system, such as second database system 112. Second database system 112 processes the data requests and operates to pre-key first database system 108 by communicating copies of key parts 134$_1$-134$_N$ and top level key 136 associated with each sorted table to first database system 108. In this example, method 600 distributes key parts 134$_1$-134$_N$ associated with a particular pre-compiled query 118 over slave nodes 204$_1$-204$_M$ at step 620. In some embodiments, each of slave nodes 204$_1$-204$_M$ may have access to more than one key part 134. In other embodiments, each of slave nodes 204$_1$-204$_M$ operates to store and provide access to key parts 134 associated with at least another one of slave nodes 204$_1$-204$_M$. Moreover, each of slave nodes 204$_1$-204$_M$ is capable of receiving multicast signals on more than one communication channel associated with system 108 of FIG. 2.

Second database system 112 also operates to communicate top level key 136 to database system 108. In this example, method 600 deploys top level keys 136 associated with a particular pre-compiled query 118 at step 630. In this particular embodiment, master node 202$_1$ operates to distribute top level keys 136 to each of master nodes 202$_2$-202$_M$.

In various embodiments, master node 202$_1$ operates to map the location of a particular key part 134$_1$-134$_N$ from its respective second node 114 to one or more communication channels associated with system 108 upon receiving a request to execute a particular pre-compiled query 118. In some cases, master node 202$_1$ has access to one or more functions capable of mapping the location of key parts 134 to one or more channel numbers, such as, for example, a modulus operation "part_no MOD num_channels."

In other embodiments, system 108 can deploy a plurality of pre-compiled queries $118_1$-$118_W$ and top level keys $136_1$-$136_X$ on each of a plurality of master nodes $202_1$-$202_M$. In some cases, system 108 deploys a particular pre-compiled query 118 and top level keys 136 associated with the particular pre-compiled query 118 on one of master nodes $202_1$-$202_M$. In that example, the master node 202 that receives the particular pre-compiled query 118 and associated top level keys 136 operates to distribute a copy of the respective pre-compiled query 118 and top level keys 136 to each of the other master nodes $202_1$-$202_M$. In other embodiments, system 108 can deploy each of pre-compiled queries $118_1$-$118_N$ and top level keys $136_1$-$136_X$ to each of master nodes $202_1$-$202_M$.

Figure 7:
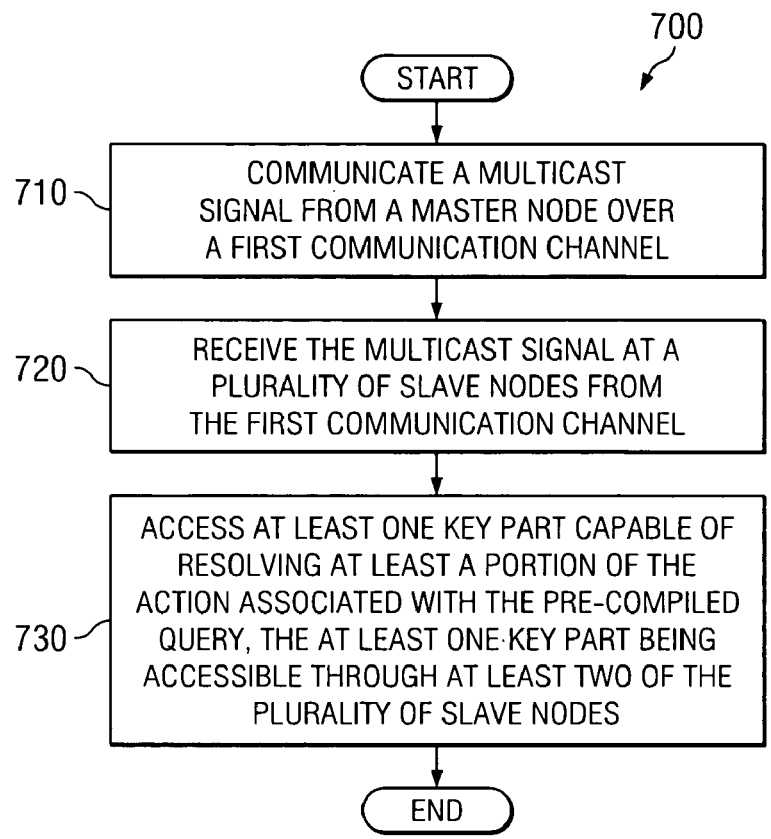
FIG. 7 is a flow chart illustrating an exemplary method for enhancing the reliability and redundancy of a database system.

FIG. 7 is a flow chart illustrating an exemplary method 700 for enhancing the reliability and redundancy of a database system. In one particular embodiment, database system 108 of FIG. 2 may be enhanced by implementing multicast communication signals and multiple communication channels. Although system 108 is used in this example, other systems may be used without departing from the scope of the present disclosure. In this example, a user of system 108 generates a request to execute a particular pre-compiled query, such as pre-compiled query $118_2$. In that example, pre-compiled query $118_2$ operates to return one or more desired addresses when any combination of one or more first names, one or more last names, and one or more social security numbers are provided in a request to system 108.

In this example, system 108 selects master node $202_3$ to receive the request from the user and to execute pre-compiled query $118_2$. Although system 108 selects master node $202_3$ to process the request in this example, any of master nodes $202_1$-$202_M$ could receive and process the request without departing from the scope of the present disclosure. In this example, master node $202_3$ reads the annotated query execution graph of pre-compiled query $118_2$ and determines that pre-compiled query $118_2$ calls for one or more remote actions and the interaction of one or more slave nodes $204_1$-$204_M$. In this particular example, master node $202_3$ determines that an action associated with resolving the request calls for an index read for all persons having the first name Chad and an index read for all the Chad's that have a last name that is phonetically similar to Thomas. Consequently, master node $202_3$ determines that pre-compiled query $118_2$ calls for index reads of key parts $134_{17}$ and $134_{18}$ to resolve the first request.

To determine the location of key parts $134_{17}$ and $134_{18}$, master node $202_3$ accesses top level key $136_2$ associated with pre-compiled query $118_2$. Master node $202_3$ identifies the location of the respective key parts 134 and maps that location to one or more communication channels using, for example, a modulus operation "part_no MOD num_channels." In this example, master node $202_3$ maps the location of key parts $134_{17}$ and $134_{18}$ from second nodes $114_{17}$ and $114_{18}$ to communication channels seventeen and eighteen, respectively.

In this example, method 700 begins at step 710 where master node $202_3$ communicates at least one multicast signal over a first communication channel. In this particular embodiment, master node $202_3$ communicates a multicast signal for an index read of key parts $134_{17}$ and $134_{18}$ on each of communication channels seventeen and eighteen. In this particular embodiment, each of the multicast signals comprises a request to perform a particular action or actions associated with pre-compiled query $118_2$. Master node $202_3$ communicates the multicast signals to all of slave nodes $204_1$-$204_M$ that are capable of receiving signals on communication channels seventeen and eighteen.

Each of slave nodes $204_1$-$204_M$ that are capable of receiving multicast signals from the first communication channel receives the multicast signal at step 720. In some embodiments, each of slave nodes $204_1$-$204_M$ that are capable of receiving multicast signals from the first communication, are also capable of receiving another multicast signal from another communication channel. In this example, slave nodes $204_6$ and $204_{16}$ are capable of receiving requests on communication channel seventeen and slave nodes $204_2$ and $204_{16}$ are capable of receiving requests on communication channel eighteen.

In this example, slave nodes $204_6$ and $204_{16}$ operate to provide access to key part $134_{17}$ at step 730. Moreover, slave nodes $204_2$ and $204_{16}$ operate to store and/or provide access to key part $134_{18}$. In this particular example, at least one of slave nodes $204_6$ and $204_{16}$ processes the multicast signal communicated on communication channel seventeen and returns the addresses for all persons having the first name Chad and a last name phonetically similar to Thomas to master node $202_3$ for further processing according to the query execution graph of pre-compiled query $118_2$. In addition, at least one of slave nodes $204_2$ and $204_{16}$ processes the multicast signal communicated on communication channel eighteen and returns all persons having the first name Chad and a last name phonetically similar to Thomas to master node $202_3$ for further processing according to the query execution graph of pre-compiled query $118_2$.

Figure 8:
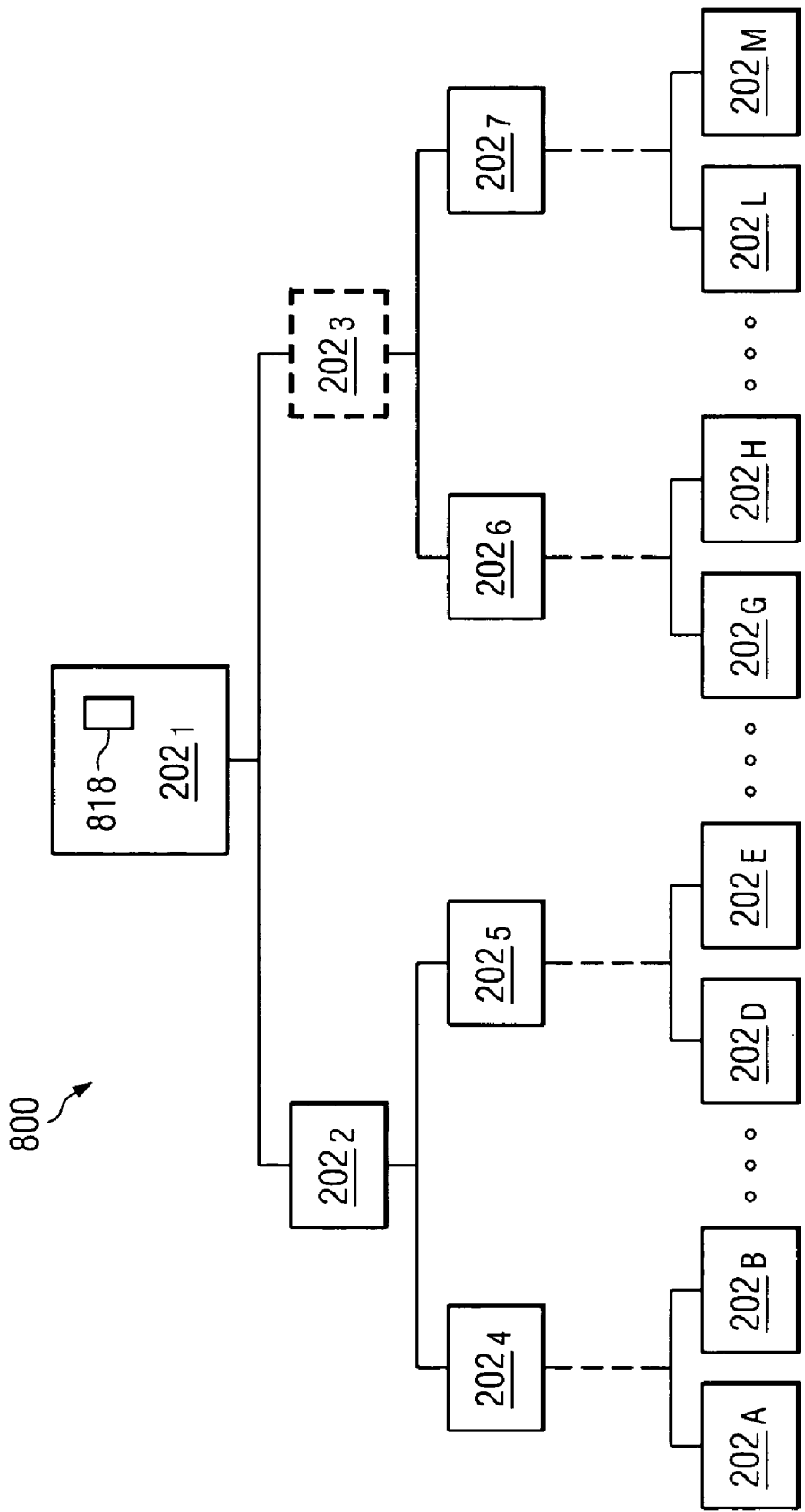
FIG. 8 is a block diagram of one method of forming a dynamically created distributed tree for use in distributing data to each of a plurality of nodes.

FIG. 8 is a block diagram of one method of forming a dynamically created distributed tree 800 for use in distributing data to each of a plurality of nodes 110. FIG. 8 illustrates just one example embodiment of a dynamically created distributed tree. It should be appreciated that other embodiments of a dynamically created distributed tree may be used without departing from the scope of the present disclosure. In this particular example, dynamically created distributed tree 800 operates to distribute one or more pre-compiled queries to each of master nodes 202. Although distributed tree 800 operates to distribute one or more pre-compiled queries to each of mater nodes 202 in this example, distributed tree 800 could also distribute one or more top level keys, system reconfiguration data, or any other data to any other location without departing from the scope of the present disclosure.

One aspect of the present disclosure provides a system and method for dynamically creating a distributed tree for distributing data within a parallel-processing system. In particular, this disclosure provides an exemplary parallel-processing database system capable of dynamically creating a distributed tree for distributing data to one or more nodes within the database system. In this example, the database system includes a plurality of master nodes $202_1$-$202_M$. It should be appreciated that the distributed tree can be dynamically created in any other parallel-processing system without departing from the scope of the present disclosure.

In this example, distributed tree 800 is formed within a parallel-processing database system, such as system 108 of FIG. 2. Distributed tree 800 includes a plurality of master nodes $202_1$-$202_M$ each capable of distributing one or more pre-compiled queries to one or more other master nodes $202_1$-$202_M$. In some embodiments, each of master nodes $202_1$-$202_M$ may be capable of distributing one or more pre-compiled queries to one or more other master nodes $202_1$-$202_M$ and to one or more slave nodes $204_1$-$204_M$ (not explicitly shown). One aspect of this disclosure recognizes that allowing any of master nodes $202_1$-$202_M$ to publish new and/or updated information to the other nodes (e.g., master nodes and/or slave nodes) enhances a database system's reliability by providing system redundancy. In most cases, the provision of system redundancy can minimize the effects of a single failure of a particular master node 202 of a database system, such as system 108.

In some embodiments, a database system may allow each of master nodes $202_1$-$202_M$ to connect with up to two other master nodes 202 during the dynamic creation of distribution tree 800. For example, the database system may allow master node $202_3$ to establish or attempt to establish a connection with master nodes $202_6$ and $202_7$, and may allow master node $202_1$ to establish or attempt to establish a connection with master nodes $202_2$ and $202_3$. In those cases, each of master nodes $202_1$-$202_M$ can have access to and/or include a table or a list of the allocated connections between all master nodes 202 within the system.

In this example, master node $202_1$ receives a pre-compiled query 818 from an external client, such as client 102 of FIG. 1. In some embodiments, master node $202_1$ may receive data related to an internal system event (e.g., the new location of a data file) from the parallel-processing system itself. In other embodiments, master node $202_1$ can receive, for example, system reconfiguration data, one or more top level keys, and/or any other data for publication and/or distribution. Although master node $202_1$ receives pre-compiled query 818 in this example, any of master nodes $202_1$-$202_M$ could receive the pre-compiled query 818 without departing from the scope of the present disclosure.

In this particular embodiment, pre-compiled query 818 is capable of resolving one or more routine and/or standard data requests that have variations in input variables. In some cases, pre-compiled query 818 can comprise a new query capable of resolving one or more routine and/or standard data requests that have variations in input variables. In other cases, pre-compiled query 818 can comprise an updated or amended version of an existing pre-compiled query.

In this example, master node $202_1$ receives pre-compiled query 818 and determines that pre-compiled query 818 includes a new version of an existing pre-compiled query and that pre-compiled query 818 should be distributed and/or published to each of master nodes $202_2$-$202_M$. Master node $202_1$ initiates the dynamic creation of distributed tree 800 by establishing or attempting to establish a connecting with at least two other master nodes 202. In this example, master node $202_1$ establishes a connection with master node $202_2$ and fails to establish a connection with master node $202_3$ (e.g., master node $202_3$ is currently off-line).

In some embodiments, master node $202_1$ can fail to establish a connection with master node $202_3$ because master node $202_3$ is currently part of another dynamically created distributed tree. When any of master nodes 202 are currently part of another dynamically created distributed tree, that master node 202 communicates a signal to its parent master node 202 indicating that it is busy. The parent master node 202, upon receiving such signal, aborts the dynamic creation of distributed tree 800, and communicates the busy status to its parent and communicates a request to abandon any connection established with any children master nodes 202. For example, if master node $202_5$ is currently part of another dynamically created distributed tree, master node $202_5$ would communicate a signal to master node $202_2$ indicating that it is busy. In that example, master $202_2$, upon receiving such signal, operates to abort the dynamic creation of distributed tree 800, and communicates the busy status to master node $202_1$ and communicates a request to abandon any connection established with master node $202_4$.

In other embodiments, master node $202_1$ can fail to establish a connection with master node $202_3$ because master node $202_3$ is currently off-line. In this particular embodiment, master node $202_1$ determines that master node $202_3$ is currently off-line and identifies the particular master nodes 202 that master node $202_3$ would connect with if on-line. In some cases, master node $202_1$ can identify the particular master nodes 202 allocated to another master node by accessing a table, list, or index that identifies the allocated and/or allowed interconnections between all master nodes 202 within the system. In this particular embodiment, master node $202_1$ identifies master nodes $202_6$ and $202_7$ as being allocated to master node $202_3$ and operates to establish a connection with master nodes $202_6$ and $202_7$.

In this particular example, master node $202_1$ establishes a connection with each of master nodes $202_2$, $202_6$, and $202_7$. In this example, each of master nodes $202_1$-$202_M$ is capable of establishing and/or attempting to establish a connection with up to two other master nodes 202 when dynamically creating distributed tree 800. Moreover, each of master nodes $202_1$-$202_M$ is capable of inter-connecting with at least two other master nodes 202 when dynamically creating distributed tree 800. Each of master nodes $202_2$, $202_6$, and $202_7$ continues the dynamic creation of distributed tree 800 by establishing or attempting to establish a connection with up to two other master nodes 202. In this example, each of master nodes $202_1$-$202_M$ has access to and/or includes a table, list, or index that identifies the allocated and/or allowed inter-connections between all master nodes 202 within the system. The dynamic creation of distributed tree 800 is continued recursively until all of the currently available master nodes $202_1$-$202_M$ are connected to distributed tree 800.

In this example, after each of master nodes $202_1$-$202_M$ are connected to distributed tree 800, each master node 202 communicates information to its parent master node 202 indicating how many master nodes 202 are connected to the distributed tree. In this particular embodiment, the information comprises a sum of all counts returned from particular children master nodes 202 and one count for the particular master node 202. For example, master node $202_2$ receives information (e.g., counts) from each of master nodes $202_4$ and $202_5$ and sums that information to determine how many master nodes 202 are connected below master node $202_2$. Master node $202_2$ then adds its information (e.g., one count) to the summed information and communicates that total master node $202_1$. In this example, the information operates to identify the master nodes 202 currently connected to the system.

After master node $202_1$ receives the information, master node $202_1$ determines whether there are a sufficient number of master nodes currently connected to the system to distribute and/or publish pre-compiled query 818. In some embodiments, the database system can dictate the minimum number or percentage of all of master nodes $202_1$-$202_M$ currently connected to the system to distribute and/or publish pre-compiled query 818. In this particular embodiment, the database system dictates that at least fifty percent (50%) of all of master nodes $202_1$-$202_M$ are currently connected to the system to distribute and/or publish pre-compiled query 818. Although this example implements a fifty percent (50%) requirement, any other desired percentage can be used without departing from the scope of the present disclosure.

In this particular embodiment, master node $202_1$ determines that at least fifty percent (50%) of master nodes $202_1$-$202_M$ are currently connected to the system. In this example, master node $202_1$ determines that there are at least fifty percent (50%) of master nodes $202_1$-$202_M$ are currently connected to the system by examining the information. In most cases, having at least fifty percent (50%) of master nodes master nodes $202_1$-$202_M$ connected to the system can ensure that there are no other active dynamically created distributed trees within the system.

In this particular embodiment, after dynamically creating distribution tree 800, master node $202_1$ stores pre-compiled query 818 and distributes and/or publishes pre-compiled query 818 to each of master nodes $202_2$, $202_6$, and $202_7$. Upon receiving pre-compiled query 818 each of master nodes $202_2$, $202_6$, and $202_7$ stores pre-compiled query 818 and distributes and/or publishes pre-compiled query 818 to at least two other master nodes 202. The storing, distribution, and/or publication of pre-compiled query 818 continues recursively until all of the currently available master nodes $202_1$-$202_M$ have received and stored pre-compiled query 818. Although master node $202_1$ initiates the distribution and creation of distributed tree 800 in this example, any or all of master nodes $202_2$-$202_M$ can perform the desired functions without departing from the scope of the present disclosure. In various embodiments, master node $202_1$ can autonomically distribute pre-compiled query 818 to each of slave nodes $204_1$-$204_M$. In some embodiments, master node $202_1$ can autonomically distribute one or more top level keys associated with pre-compiled query 818 to each of master nodes $202_2$-$202_M$. In other embodiments, master node $202_1$ can autonomically distribute a new system configuration to each of master nodes $202_2$-$202_M$.

The dynamic creation of distribution tree 800 can allow a database system to ensure that each of master nodes $202_1$-$202_M$ have access to and/or includes the current version and/or the same information. In some cases, distribution tree 800 can also ensure that each of slave nodes $204_1$-$204_M$ have access to and/or include the current version and/or the same information. One aspect of this disclosure recognizes that ensuring that each of master nodes $202_1$-$202_M$ have access to and/or include the current version of pre-compiled query 818 enhances a database system's processing efficiency.

In various embodiments, one or more master nodes 202 that were off-line and/or unavailable to receive the new, updated, and/or amended pre-compiled query published and/or distributed to the database system are capable of receiving the new, updated, and/or amended pre-compiled query upon reconnecting and/or becoming available to the database system. In some cases, the one or more off-line and/or unavailable master nodes 202 can receive the new, updated, and/or amended pre-compiled, query upon reconnecting to the database system, by requesting the current versions of the pre-compiled queries from one of the master nodes 202 that such off-line and/or unavailable master node 202 would have connected with if on-line. In this example, master node $202_3$ communicates with master nodes $202_6$ and $202_8$ upon becoming available to the database system to determine if master node $202_3$ missed a distribution and/or publication. In this particular embodiment, master node $202_3$ determines that it was off-line during the distribution and/or publication of pre-compiled query 818 and requests that one of master nodes $202_6$ and $202_8$ communicate a copy of the current version of pre-compiled query 818.

Figure 9:
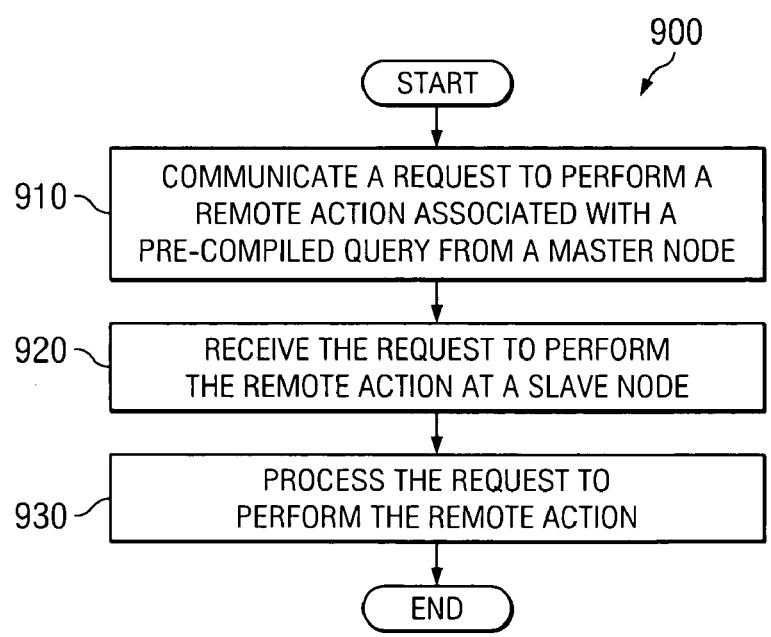
FIG. 9 is a flow chart illustrating an exemplary method for processing a pre-compiled query using one or more activity ID's.

FIG. 9 is a flow chart illustrating an exemplary method 900 for processing a pre-compiled query using one or more activity ID's. In one particular embodiment, database system 108 of FIG. 2 may be used to process a pre-compiled query using one or more activity ID's. Although system 108 is used in this example, other systems may be used without departing from the scope of the present disclosure. In this example, a user of system 108 generates a request to execute a particular pre-compiled query, such as pre-compiled query $118_2$. In that example, pre-compiled query $118_2$ operates to return one or more desired addresses when any combination of one or more first names, one or more last names, and one or more social security numbers are provided in a request to system 108.

In this example, system 108 selects master node $202_3$ to receive the request from the user and to execute pre-compiled query $118_2$. Although system 108 selects master node $202_3$ to process the request in this example, any of master nodes $202_1$-$202_M$ could receive and process the request without departing from the scope of the present disclosure. In this example, master node $202_3$ reads the annotated query execution graph of pre-compiled query $118_2$ and determines that pre-compiled query $118_2$ calls for one or more remote actions and the interaction of one or more slave nodes $204_1$-$204_M$. In this particular example, master node $202_3$ determines that an action associated with resolving the request calls for an index read for all persons having the first name Chad and an index read for all the Chad's that have a last name that is phonetically similar to Thomas. Consequently, master node $202_3$ determines that pre-compiled query $118_2$ calls for index reads of key parts $134_{17}$ and $134_{18}$ to resolve the first request.

To determine the location of key parts $134_{17}$ and $134_{18}$, master node $202_3$ accesses top level key $136_2$ associated with pre-compiled query $118_2$. Master node $202_3$ identifies the location of the respective key parts 134 and maps that location to one or more communication channels using, for example, a modulus operation "part_no MOD num_channels." In this example, master node $202_3$ maps the location of key parts $134_{17}$ and $134_{18}$ from second nodes $114_{17}$ and $114_{18}$ to communication channels seventeen and eighteen, respectively.

In this example, method 900 begins at step 910 where master node $202_3$ communicates one or more request to perform a remote action associated with pre-compiled query $118_2$. In this particular embodiment, master node $202_3$ communicates a request for an index read of key parts $134_{17}$ and $134_{18}$ on each of communication channels seventeen and eighteen. Master node $202_3$ communicates the request to all of slave nodes $204_1$-$204_M$ that are capable of receiving signals on communication channels seventeen and eighteen. In this particular embodiment, each of the requests includes an activity ID that identifies the particular remote action that master node $202_3$ is requesting the one or more slave nodes 204 to perform.

At least one of slave nodes $204_1$-$204_M$ that is capable of receiving the request to perform the remote action receives the request at step 920. In this particular embodiment, slave nodes $204_6$ and $204_{16}$ are capable of receiving requests on communication channel seventeen, and slave nodes $204_2$ and $204_{16}$ are capable of receiving requests on communication channel eighteen. Moreover, slave nodes $204_6$ and $204_{16}$ operate to store and/or provide access to key part $134_{17}$, and slave nodes $204_2$ and $204_{16}$ operate to store and/or provide access to key part $134_{18}$. In this particular embodiment, master node $202_3$ communicates the requests in one or more multicast signals on communication channel seventeen to each of slave nodes $204_6$ and $204_{16}$ and on communication channel eighteen to each of slave nodes $204_2$ and $204_{16}$.

In this example, at least one of slave nodes $204_6$ and $204_{16}$ processes the request communicated on communication channel seventeen, while at least one of slave nodes $204_2$ and $204_{16}$ processes the request communicated on communication channel eighteen. In one particular example, slave node $204_{16}$ processes the request to perform the remote action communicated on communication channel seventeen at step 930. Moreover, slave node $204_2$ processes the request to perform the remote action communicated on communication channel eighteen. Upon receiving the request to perform the remote action from communication channels seventeen and eighteen, each of slave nodes $204_{16}$ and $204_2$ operates to read the request.

In this example, each of slave nodes $204_{16}$ and $204_2$ reads the request and identifies an activity ID that operates to perform a first index read on a first name and a second index read on phonetically similar last names. Each of slave nodes $204_{16}$ and $204_2$ processes the respective request using one or more DLL's associated with the particular activity ID and operates to communicate the addresses for all persons having the first name Chad and a last name phonetically similar to Thomas and slave node to master node $202_3$ for further processing according to the query execution graph of pre-compiled query $118_2$. For example, slave node $204_{16}$ may processes the multicast signal communicated on channel seventeen by using the one or more variables supplied by the first user of system 108 and executing one or more DLL's associated with pre-compiled query $118_2$. In certain embodiments, each of slave nodes $204_{16}$ and $204_2$ may have access to one or more helper files capable of directing each of slave nodes $204_{16}$ and $204_2$ to the location of particular DLL's associated with the activity ID.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A database system, including memory and at least one processor, capable of deploying a pre-compiled query and pre-keying data associated with the pre-compiled query, the system comprising:
    at least one master node operable to store a pre-compiled query and a top level key, the pre-compiled query being stored on the master node in advance of receiving a plurality of data requests capable of being resolved by the pre-compiled query;
    a communication channel; and
    a plurality of slave nodes coupled to the at least one master node by the communication channel, each of the plurality of slave nodes operable to store one or more key parts comprising a portion of a data file sorted based on the pre-compiled query in advance of receiving the plurality of data requests,
    wherein the top level key associates a particular one of the key parts with one of the plurality of slave nodes that stores the particular one of the key parts, and
    wherein the at least one master node executes the pre-compiled query by communicating the data requests over the communication channel to the plurality of slave nodes, and the plurality of slave nodes perform operations responsive to the data requests to resolve the data requests by accessing the one or more key parts.

2. The system of claim 1, wherein each of the plurality of slave nodes operates to store the pre-compiled query.

3. The system of claim 2, wherein the pre-compiled query is stored on the at least one master node and each of the plurality of slave nodes in advance of a user providing the data request to the database system.

4. The system of claim 1, wherein the pre-compiled query operates to resolve routine data requests that are capable of having variations in input parameters.

5. The system of claim 1, wherein the pre-compiled query operates to resolve routine data requests that are capable of having variations in intermediate results of the pre-compiled query.

6. The system of claim 1, wherein the pre-compiled query comprises an annotated query execution graph and one or more executables.

7. The system of claim 1, wherein the top level key is capable of identifying a communication channel that communicates with one or more of the plurality of slave nodes that store a particular key part.

8. The system of claim 1, wherein each of the plurality of slave nodes comprise one or more memory modules capable of storing the one or more key parts associated with a sorted table.

9. The system of claim 8, wherein the memory module comprises a hard disk.

10. The system of claim 1, wherein each of the one or more key parts comprises a portion of a sorted data file.

11. The system of claim 1, wherein at least some of the one or more key parts are stored on at least some of the plurality of slave nodes in advance of a user requesting data from such key parts.

12. The system of claim 1, further comprising a plurality of master nodes, each of the plurality of master nodes operable to store the pre-compiled query and one or more top level keys associated with the pre-compiled query.

13. A method of forming a database system, the method comprising:
    deploying a pre-compiled query to at least one master node, the pre-compiled query being stored on the master node in advance of receiving a plurality of data requests capable of being resolved by the pre-compiled query;
    pre-keying the database system, wherein pre-keying the database system comprises:
        deploying a plurality of key parts to a plurality of slave nodes, each of the plurality of key parts comprising a portion of a data file sorted based on the pre-compiled query in advance of receiving the plurality of data requests;
        deploying one or more top level keys associated with the pre-compiled query to the at least one master node, the one or more top level keys associating a particular one of the key parts with one of the plurality of slave nodes that stores the particular one of the key parts, and
        configuring the at least one master node to execute the pre-complied query by communicating the data requests over a communication channel to the plurality of slave nodes, and configuring the plurality of slave nodes to perform operations responsive to the data requests to resolve the data requests by accessing the one or more key parts.

14. The method of claim 13, wherein the pre-compiled query is deployed to each of the plurality of slave nodes.

15. The method of claim 13, wherein deploying the pre-compiled query is done in advance of a user providing the data request to the database system.

16. The method of claim 13, wherein the pre-compiled query operates to resolve a routine data request that is capable of having variations in input parameters.

17. The method of claim 13, wherein the one or more top level keys identify a communication channel that communicates with one or more of the plurality of slave nodes that store a particular key part.

18. The method of claim 13, deploying the plurality of key parts comprises:
    communicating each key part to the database system; and
    storing each key part on at least one memory module coupled to a particular one or more slave nodes.

19. The method of claim 18, wherein the memory module comprises a hard disk.

20. The method of claim 13, wherein deploying the plurality of key parts is done in advance of a user providing the data request to the database system.

21. The method of claim 13, further comprising distributing the pre-compiled query and the one or more top level keys to each of a plurality of master nodes coupled to the at least master node.

22. A computer-implemented system for pre-keying a database system, comprising:
- one or more computer processors operably connected to one or more computer-readable media, the computer-readable media containing instructions to cause the one or more processors to:
  - deploy a pre-compiled query to at least one master node, the pre-compiled query being stored on the master node in advance of receiving a plurality of data requests capable of being resolved by the pre-compiled query;
  - deploy a plurality of key parts to a plurality of slave nodes, each of the plurality of key parts comprising a portion of a data file sorted based on the pre-compiled query in advance of receiving the plurality of data requests; and
  - deploy one or more top level keys associated with the pre-compiled query to the at least one master node, the one or more top level keys including the first field and associating a particular one of the key parts with one of the plurality of slave nodes that stores the particular one of the key parts,
- wherein the at least one master node is configured to execute the pre-compiled query by communicating the data requests over a communication channel to the plurality of slave nodes, and the plurality of slave nodes perform operations responsive to the data requests to resolve the data requests by accessing the one or more key parts.

23. The database system according to claim 1, wherein the top level key identifies, for a first field identified by the pre-compiled query, a range of values for each of the one or more key parts.

24. The database system according to claim 1, wherein the master node stores the one or more key parts.

* * * * *

UNITED STATES PATENT AND TRADEMARK OFFICE
CERTIFICATE OF CORRECTION

PATENT NO. : 7,693,826 B1  Page 1 of 1
APPLICATION NO. : 10/866270
DATED : April 6, 2010
INVENTOR(S) : Richard K. Chapman et al.

It is certified that error appears in the above-identified patent and that said Letters Patent is hereby corrected as shown below:

On the Title Page, Item (75), in the list of "Inventors",
 line 3, "Gavin C. Halliday, Royston" should read
 --Gavin C. Halliday, Great Chishill--.

On the Title Page, Item (75), in the list of "Inventors",
 line 4, "Nigel G. Hicks, London" should read
 --Nigel G. Hicks, Chiswick--.

On the Title Page, Item (75), in the list of "Inventors",
 lines 5-6, "Jacob Cobbett-Smith, Greater London" should read
 --Jacob Cobbett-Smith, London--.

In claim 8, column 30, line 9, "comprise" should read --comprises--.

In claim 13, column 30, line 44, "pre-complied" should read
 --pre-compiled--.

Signed and Sealed this

Eighth Day of June, 2010

David J. Kappos
*Director of the United States Patent and Trademark Office*